(12) United States Patent
Li

(10) Patent No.: US 11,270,832 B2
(45) Date of Patent: Mar. 8, 2022

(54) INTEGRATED MAGNETIC DEVICE AND DIRECT CURRENT-DIRECT CURRENT CONVERTER

(71) Applicant: Murata Manufacturing Co., Ltd., Nagaokakyo (JP)

(72) Inventor: Gang Li, Hubei (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 293 days.

(21) Appl. No.: 16/720,067

(22) Filed: Dec. 19, 2019

(65) Prior Publication Data

US 2020/0219643 A1    Jul. 9, 2020

(30) Foreign Application Priority Data

Jan. 4, 2019  (CN) .......................... 201910009023.1
Jan. 4, 2019  (CN) .......................... 201920013420.1

(51) Int. Cl.
*H01F 27/28*  (2006.01)
*H01F 27/24*  (2006.01)
(Continued)

(52) U.S. Cl.
CPC ............. *H01F 27/28* (2013.01); *H01F 27/06* (2013.01); *H01F 27/24* (2013.01); *H02M 3/33569* (2013.01); *H02M 7/003* (2013.01)

(58) Field of Classification Search
CPC .......... H01F 27/28; H01F 27/06; H01F 27/24; H02M 3/33569
See application file for complete search history.

(56) References Cited

U.S. PATENT DOCUMENTS 3,684,991 A * 8/1972 Trump ................. H01F 27/343
                                                        336/70
10,361,023 B2 * 7/2019 Dally ..................... H01F 38/14
2010/0232181 A1    9/2010 Nakahori

FOREIGN PATENT DOCUMENTS

CN    101860235 A    10/2010
JP    2010-246364 A    10/2010
JP    2015-142419 A    8/2015

OTHER PUBLICATIONS

Official Communication issued in corresponding Japanese Patent Application No. 2019-236277, dated Jan. 5, 2021.

* cited by examiner

*Primary Examiner* — Adolf D Berhane
*Assistant Examiner* — Afework S Demisse
(74) *Attorney, Agent, or Firm* — Keating & Bennett, LLP

(57) ABSTRACT

An integrated magnetic device includes a magnetic core, primary windings and secondary windings, wherein the primary and secondary windings are wound around magnetic columns to define closed magnetic flux loop, the primary windings include a first primary winding wound around the first and second magnetic columns and a second primary winding wound around the third and fourth magnetic columns, winding directions of the first and second primary windings are opposite, when a voltage is applied to the primary windings, current flows through a portion of the secondary windings wound around the first magnetic column or a portion of the secondary windings wound around the second magnetic column due to induced electromotive force, and current flows through a portion of the secondary windings wound around the third magnetic column or a portion of the secondary windings wound around the fourth magnetic column due to induced electromotive force.

19 Claims, 13 Drawing Sheets

(51) Int. Cl.
*H02M 3/335* (2006.01)
*H02M 7/00* (2006.01)
*H01F 27/06* (2006.01)

INTEGRATED MAGNETIC DEVICE AND DIRECT CURRENT-DIRECT CURRENT CONVERTER

CROSS REFERENCE TO RELATED APPLICATIONS

This application claims the benefit of priority to Chinese Patent Application No. 201910009023.1 filed on Jan. 4, 2019 and Chinese Patent Application No. 201920013420.1 filed on Jan. 4, 2019. The entire contents of each application are hereby incorporated herein by reference.

BACKGROUND OF THE INVENTION

1. Field of the Invention

The present invention generally relates to an integrated magnetic technology field, and more particularly, to an Integrated Magnetic (IM) device and a Direct Current-Direct Current (DC-DC) converter.

2. Description of the Related Art

For electric vehicle (EV) and hybrid electric vehicle (HEV) markets, Direct Current-Direct Current (DC-DC) converters able to convert high input voltages (about 200V to about 420V) to low output voltages (about 10.8V to about 14.2V) and high output currents (about 150 A) are quite essential devices.

Currently, step-down converters have been widely used. For example, LLC converters, half-bridge converters or full-bridge converters are usually used to achieve the effect of a one-step-down bulk converter.

To obtain a converter with higher efficiency and a smaller volume, an idea of integrated-magnetic-technology that integrates a transformer and an output inductor of a current doubler rectifier has been proposed in existing techniques. For example, Chinese patent application CN101860235A discloses a structure in which windings of a transformer integrated with output inductors are wound around E-shaped magnetic cores to realize integrated magnetics.

Specifically, referring to FIG. 1, the Chinese patent application CN101860235A discloses an IM half bridge current doubler rectifier system 100. The system 100 includes a phase shift half bridge circuit 101 (referred to as a half bridge converter in FIG. 2) as an inverter and a main source voltage obtaining unit 102. The main source voltage obtaining unit 102 includes an EE-type IM component 103 having three magnetic columns, and primary windings and secondary windings of the IM component 103 are wound around a left leg and a right leg of the IM component 103. A middle leg (also referred to as a center column) of the IM component 103 is used to offset magnetic flux in an opposite direction, so that the magnetic flux can define a closed magnetic flux loop on the left and right legs of the IM component 103.

With increasing requirements on power transmission by market, for example, it is desired that power transmission from about 1500 watts (W) to about 1800 W can be achieved, a size of converters needs to be very large to meet the aforementioned power requirements. The larger the size of the converter, the higher the manufacturing cost, and magnetic flux loss causes power loss.

Therefore, the existing techniques cannot provide a converter having a relatively small size and a high power output.

SUMMARY OF THE INVENTION

Preferred embodiments of the present invention provide IM devices and DC-DC converters which each have a relatively small size and a low magnetic loss.

In a preferred embodiment of the present invention, an IM device includes a magnetic core, primary windings and secondary windings, wherein the magnetic core includes a base plate, a cover plate, and magnetic columns between the base plate and the cover plate; the primary windings and the secondary windings are respectively wound around the magnetic columns to define a closed magnetic flux loop; the magnetic columns include a first magnetic column, a second magnetic column, a third magnetic column, and a fourth magnetic column; the primary windings include a first primary winding and a second primary winding, wherein the first primary winding is wound around the first magnetic column and the second magnetic column, the second primary winding is wound around the third magnetic column and the fourth magnetic column, a winding direction of the first primary winding is opposite to that of the second primary winding, and the first primary winding and the second primary winding are electrically connected in series or in parallel; the secondary windings are wound around the first magnetic column, the second magnetic column, the third magnetic column, and the fourth magnetic column; when a voltage is applied to the primary windings, a current flows through one of a portion of the secondary windings wound around the first magnetic column and a portion of the secondary windings wound around the second magnetic column due to an induced electromotive force, and a current flows through one of a portion of the secondary windings wound around the third magnetic column and a portion of the secondary windings wound around the fourth magnetic column due to the induced electromotive force, wherein the induced electromotive force is generated by a current flowing through the primary windings; the primary windings include a primary winding start end and a primary winding terminal end, the primary winding start end is a first primary end of the IM device, and the primary winding terminal end is a second primary end of the IM device; and the secondary windings include a secondary winding start end and a secondary winding terminal end, the secondary winding start end is a first secondary end of the IM device, and the secondary winding terminal end is a second secondary end of the IM device.

With a preferred embodiment of the present invention, a size of the IM device and a magnetic flux loss may be reduced, thus providing accurate voltage conversion. The magnetic core includes four magnetic columns. Windings are wound around the four magnetic columns to obtain multiple primary windings and multiple secondary windings, so that two IM devices are equivalently integrated. Further, according to the winding arrangement of the primary windings and the secondary windings on the magnetic core, reverse magnetic flux of two transformers after the integration are able to cancel each other, and thus a center column in an existing magnetic core is able to be canceled. This greatly reduces the size of the IM device. In addition, the cancellation of the center column may effectively reduce the magnetic flux loss and significantly improve conversion efficiency of the entire IM device.

In a preferred embodiment of the present invention, an IM device includes a magnetic core, a primary winding and secondary windings, wherein the magnetic core includes a base plate, a cover plate and magnetic columns between the base plate and the cover plate; the primary winding and the secondary windings are respectively wound around the magnetic columns to define a closed magnetic flux loop; the magnetic columns include a first magnetic column, a second magnetic column, a third magnetic column, and a fourth magnetic column; the primary winding is wound around the first magnetic column and the second magnetic column, and winding directions of the primary winding on the first magnetic column and the second magnetic column are the same; when a voltage is applied to the primary winding, a current flows through one of a portion of the secondary windings wound around the first magnetic column and a portion of the secondary windings wound around the second magnetic column due to an induced electromotive force, and a current flows through one of a portion of the secondary windings wound around the third magnetic column and a portion of the secondary windings wound around the fourth magnetic column due to the induced electromotive force, wherein the induced electromotive force is generated by a current flowing through the primary winding; the primary winding has a primary winding start end and a primary winding terminal end, the primary winding start end is a first primary end of the IM device, and the primary winding terminal end is a second primary end of the IM device; and the secondary windings include a secondary winding start end and a secondary winding terminal end, the secondary winding start end is a first secondary end of the IM device, and the secondary winding terminal end is a second secondary end of the IM device.

With a preferred embodiment of the present invention, a size of the IM device and a magnetic flux loss may be reduced, thus providing accurate voltage conversion. The magnetic core includes four magnetic columns. Windings are wound around the four magnetic columns to obtain a primary winding and multiple secondary windings, so that two IM devices are equivalently integrated. Further, according to the winding arrangement of the primary winding and the secondary windings on the magnetic core, reverse magnetic flux of two transformers after the integration are able to cancel each other, and thus a center column in an existing magnetic core is able to be canceled. This greatly reduces the size of the IM device. In addition, the cancellation of the center column may effectively reduce the magnetic flux loss and significantly improve conversion efficiency of the entire IM device.

In a preferred embodiment of the present invention, a DC-DC converter includes any one of the above IM devices. The DC-DC converter further includes a primary circuit coupled to the first primary end and the second primary end of the IM device; and a secondary circuit coupled to the first secondary end and the second secondary end of the IM device.

As a structure of the IM device is significantly improved, a size of the DC-DC converter is reduced accordingly, which enables the DC-DC converter to possess larger power with a smaller size and lower cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
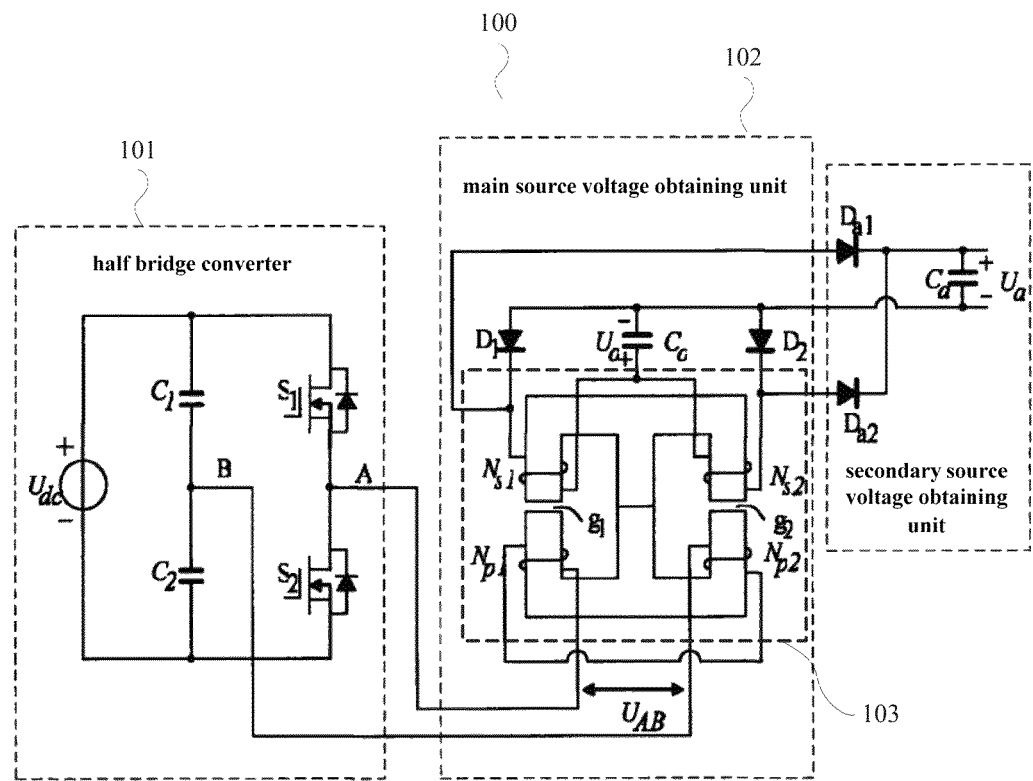
FIG. 1 shows a structural diagram of an IM half bridge current doubler rectifier system in existing techniques.

Preferred embodiments of the present invention provide IM devices and DC-DC converters. In following preferred embodiments of the present invention, IM devices are applied in a phase shift half bridge current doubler rectifier circuit. However, it is understood that the present invention is not limited thereto. The IM devices may be applied in other types of current doubler rectifier circuits.

Hereinafter, preferred embodiments of the present invention are described in detail with reference to drawings. Same portions are denoted by same reference numerals in the drawings. The preferred embodiments below are merely examples, and it is a matter of course that structures shown in different preferred embodiments may be partially replaced or combined. Common features among different preferred embodiments are omitted, and merely differences are described. In particular, same advantageous effects produced by same structures are not described one by one in each preferred embodiment.

In order to clarify the solutions and advantages of preferred embodiments of the present invention, preferred embodiments of present invention will be described clearly in detail in conjunction with accompanying drawings.

Figure 2:
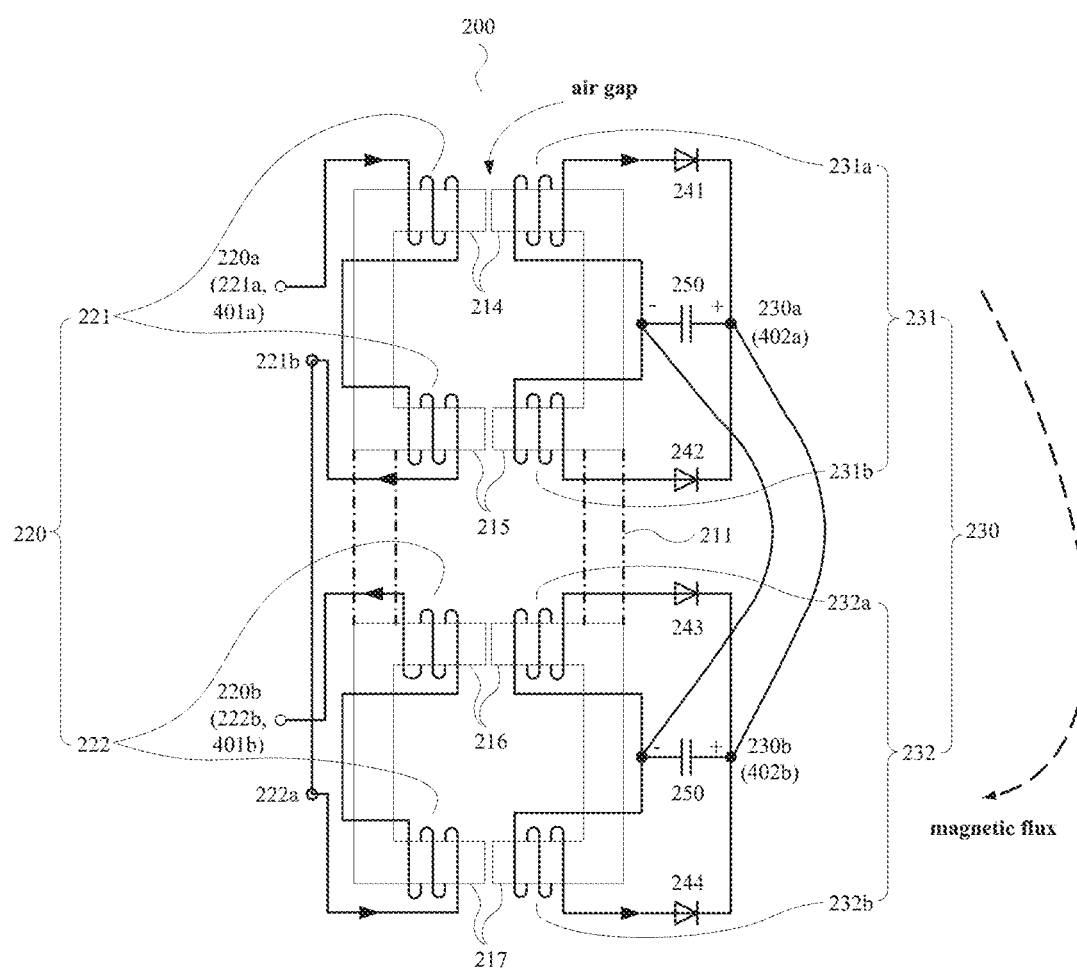
FIG. 2 shows a principle diagram of an IM device according to a preferred embodiment of the present invention.
Figure 3:
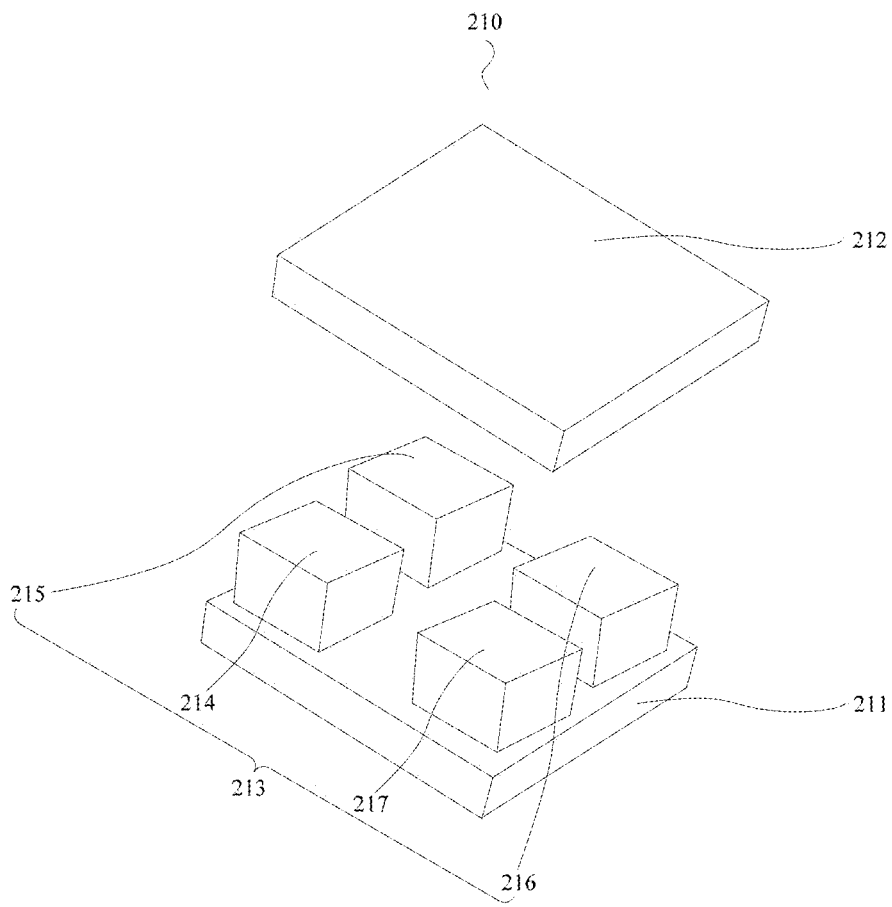
FIG. 3 shows a magnetic core in the IM device as shown in FIG. 2 according to a preferred embodiment of the present invention.
Figure 4:
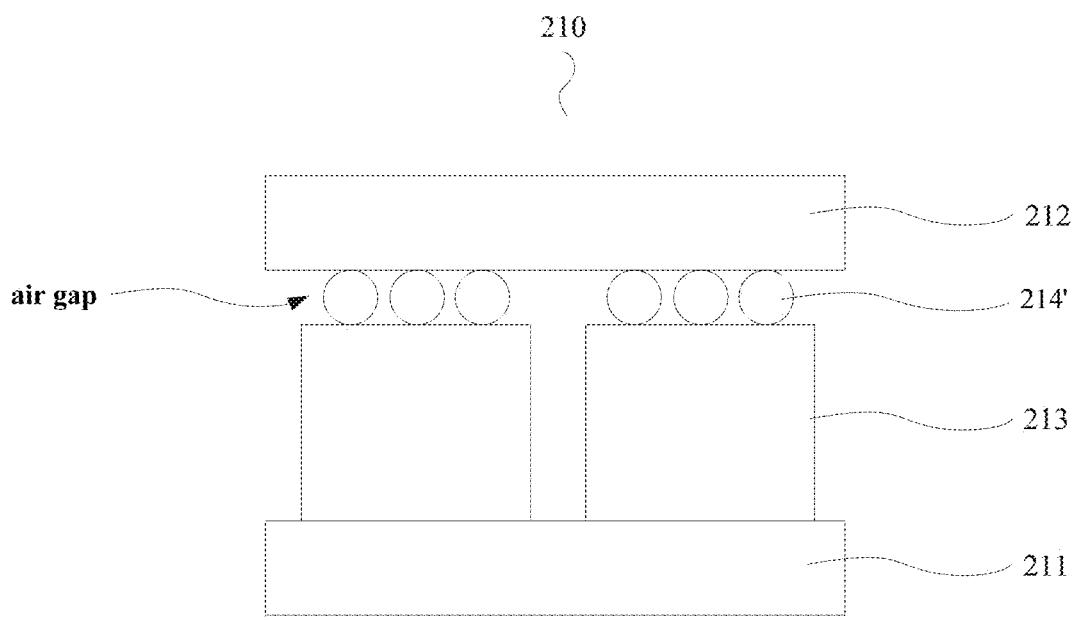
FIG. 4 shows a sectional view of the magnetic core as shown in FIG. 3 according to a preferred embodiment of the present invention.
Figure 5:
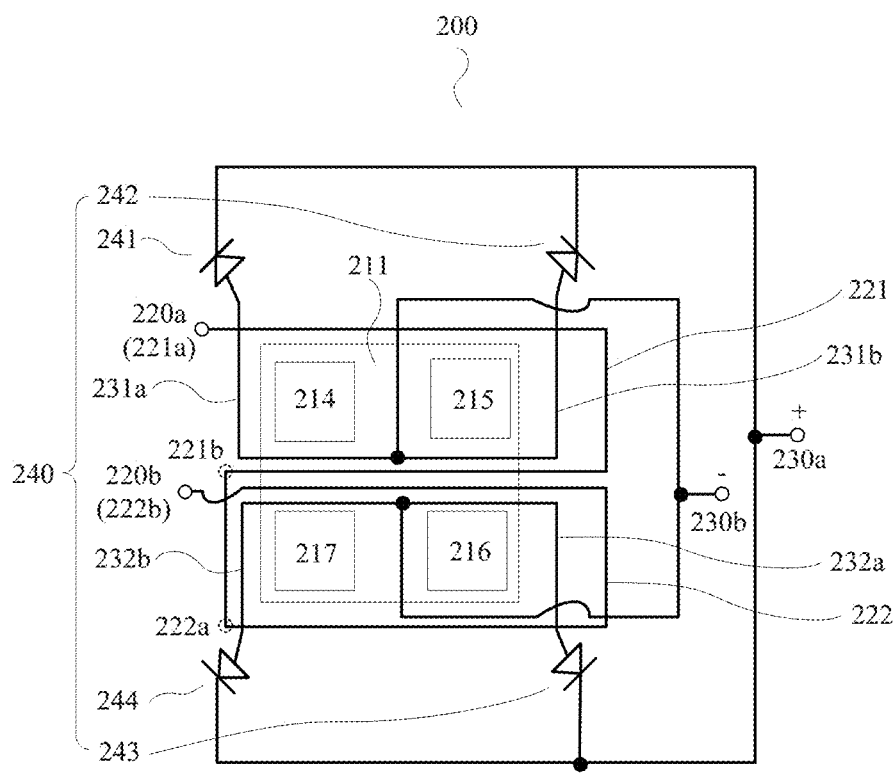
FIG. 5 shows a detailed structure of the IM device as shown in FIG. 2 according to a preferred embodiment of the present invention.

FIG. 2 shows a principle diagram of an IM device 200 according to a preferred embodiment of the present invention, FIG. 3 shows a magnetic core 210 in the IM device 200 as shown in FIG. 2, FIG. 4 shows a sectional view of the magnetic core 210 as shown in FIG. 3, and FIG. 5 shows a detailed structure of the IM device as shown in FIG. 2.

Referring to FIGS. 2 and 3, the IM device 200 includes a magnetic core 210, primary windings 220, and secondary windings 230.

Referring to FIGS. 3 and 4, the magnetic core 210 includes a base plate 211, a cover plate 212, and magnetic columns 213 between the base plate 211 and the cover plate 212. The base plate 211 may be parallel or substantially parallel to the cover plate 212. An air gap may be provided at any position of the magnetic columns 213 to prevent the IM device 200 from generating magnetic saturation during operation. FIG. 2 shows a situation where an air gap is provided in the middle of the magnetic columns 213.

In some preferred embodiments of the present invention, the air gap may be provided between the magnetic columns 213 and the base plate 211 or the cover plate 212. For example, referring to FIG. 4, at least one spacer bead 214' may be provided between the cover plate 212 and the magnetic column 213 to define the air gap between the cover plate 212 and the magnetic column 213.

In some preferred embodiments of the present invention, there may be a gap between adjacent spacer beads 214' to further increase the air gap.

In some preferred embodiments of the present invention, a plurality of spacer beads 214' may be arrayed on an upper surface of the magnetic columns 213 and contact with the cover plate 212.

Referring to FIGS. 3 and 4, the magnetic columns 213 may include a first magnetic column 214, a second magnetic column 215, a third magnetic column 216, and a fourth magnetic column 217. Although in FIG. 3 the magnetic columns have a square shape in cross section, the present invention is not limited thereto. In some preferred embodiments of the present invention, the magnetic columns may have a rectangular, circular, or oval cross section, or a cross section that is substantially defined by one of these shapes.

In some preferred embodiments of the present invention, the base plate 211, the cover plate 212, and the magnetic column 213 may preferably be made of a magnetic core material, for example, manganese-zinc ferrite or nickel-zinc ferrite, to increase magnetic induction strength of the IM device 200.

In some preferred embodiments of the present invention, one side of the base plate 211 and one side of the cover plate 212 parallel or substantially parallel to each other may be a rectangular or substantially rectangular structure with a same or similar area, for example, squares or rectangles. In practice, those skilled in the art can also adjust shapes of the base plate 211 and the cover plate 212 according to predetermined parameters to obtain a magnetic coupling effect that meets the predetermined parameters.

In some preferred embodiments of the present invention, to obtain a better and more uniform magnetic coupling effect, the first magnetic column 214, the second magnetic column 215, the third magnetic column 216, and the fourth magnetic column 217 are arranged at or substantially at four vertices of a rectangle.

It should be noted that the first magnetic column 214, the second magnetic column 215, the third magnetic column 216, and the fourth magnetic column 217 are four same or equivalent magnetic columns 213 in terms of device structure and physical properties. FIG. 2 can be regarded as expanded views of FIGS. 3 and 4. From top to bottom in FIG. 2, the four magnetic columns 213 are sequentially equivalent to the first magnetic column 214, the second magnetic column 215, the third magnetic column 216, and the fourth magnetic column 217 as shown in FIGS. 3 and 4.

Further, still referring to FIG. 2, the primary windings 220 and the secondary windings 230 may be wound around the magnetic columns 213 to define a closed magnetic flux loop. For example, the primary windings 220 may be wound around a portion of the magnetic columns 213 adjacent to or in a vicinity of the base plate 211, and the secondary windings 230 may be wound around a portion of the same magnetic columns 213 adjacent to or in a vicinity of the cover plate 212, and vice versa. Therefore, the primary winding 220 and the secondary windings 230 wound around the same magnetic column 213 can produce a magnetic coupling effect. The closed magnetic flux loop circulates in the entire IM device 200 along a direction of a dotted arrow shown in FIG. 2.

Therefore, by the windings being wound around the four magnetic columns 213, multiple primary windings and multiple secondary windings are obtained, thus equivalently integrating two transformers in one IM device 200, so that integration for IM becomes possible.

In a preferred embodiment of the present invention, the number of the primary windings is preferably two, and the number of the secondary windings is preferably two, for example. The two primary windings are wound around the first magnetic column 214, the second magnetic column 215, the third magnetic column 216, and the fourth magnetic column 217 respectively, and the two secondary windings are also wound around the first magnetic column 214, the second magnetic column 215, the third magnetic column 216, and the fourth magnetic column 217 respectively. That is, all of the four magnetic columns 213 of the magnetic core 210 are wound by the primary windings and the secondary windings, and thus there is no need to set a center column of an E-type magnetic core commonly used in existing transformers.

In some preferred embodiments of the present invention, the primary windings 220 may include a first primary winding 221 and a second primary winding 222. The first primary winding 221 may be wound around any two of the first magnetic column 214, the second magnetic column 215, the third magnetic column 216, and the fourth magnetic column 217, and the second primary winding 222 are wound around the other two magnetic columns 213.

Referring to FIGS. 2 and 5 (the cover plate 212 is not shown in FIG. 5), the first primary winding 221 may be wound around the first magnetic column 214 and the second magnetic column 215, and the second primary winding 222 may be wound around the third magnetic column 216 and the fourth magnetic column 217. As the first magnetic column 214, the second magnetic column 215, the third magnetic column 216, and the fourth magnetic column 217 are all the same or equivalent in physical properties and device structures, merely the magnetic columns 213 wound by the first primary winding 221 and the second primary winding 222 are labeled for example in the figures of the preferred embodiments. In practice, the first primary winding 221 may be wound around the first magnetic column 214 and the third magnetic column 216, and the second primary winding 222 may be wound around the second magnetic column 215 and the fourth magnetic column 217. Or, the first primary winding 221 may be wound around the first magnetic column 214 and the fourth magnetic column 217, and the second primary winding 222 may be wound around the second magnetic column 215 and the third magnetic column 216.

In some preferred embodiments of the present invention, winding directions of the first primary winding 221 and the second primary winding 222 are opposite. For example, referring to FIGS. 2 and 5, a primary winding start end 220a of the primary windings 220 is a start end 221a of the first primary winding 221, and a primary winding terminal end 220b of the primary windings 220 is a terminal end 222b of the second primary winding 222. For FIG. 2, from the perspective of illustration, the first primary winding 221 is wound counterclockwise around the first magnetic column 214 and the second magnetic column 215 from its start end 221a to its terminal end 221b, while the second primary winding 222 is wound clockwise around the third magnetic column 216 and the fourth magnetic column 217 from its start end 222a to its terminal end 222b. For FIG. 5, the first primary winding 221 is wound clockwise around the first magnetic column 214 and the second magnetic column 215 from its start end 221a to its terminal end 221b, while the second primary winding 222 is wound counterclockwise around the third magnetic column 216 and the fourth magnetic column 217 from its start end 222a to its terminal end 222b.

In some preferred embodiments of the present invention, the first primary winding 221 and the second primary winding 222 may be electrically connected in series. In other words, the terminal end 221b of the first primary winding 221 may be electrically connected in series with the start end 222a of the second primary winding 222. Referring to FIG. 5, in practice, a coil may be used to wind the first magnetic column 214 and the second magnetic column 215 from the first magnetic column 214 at an angle as shown in FIG. 5, and then to wind the fourth magnetic column 217 and the third magnetic column 216, thus defining the first primary winding 221 and the second primary winding 222. The first primary winding 221 and the second primary winding 222 are electrically connected via their respective start ends and terminal ends to provide the series connection of the first primary winding 221 and the second primary winding 222.

In some preferred embodiments of the present invention, the first primary winding 221 is taken as an example. A magnetic coupling effect obtained by coils of the first primary winding 221 being wound around the first magnetic column 214 and the second magnetic column 215 one by one as shown in FIG. 2 is similar to that obtained by the coils being wound around the first magnetic column 214 and the second magnetic column 215 together as shown in FIG. 5. The same or similar applies to the second primary winding 222 and the secondary windings 230.

In some preferred embodiments of the present invention, the secondary windings 230 may be wound around the first magnetic column 214, the second magnetic column 215, the third magnetic column 216, and the fourth magnetic column 217. When a voltage is applied to the primary windings 220 (including the first primary winding 221 and the second primary winding 222), an induced electromotive force induced on a portion of the secondary windings 230 wound around the first magnetic column 214 and an induced electromotive force induced on a portion of the secondary windings 230 wound around the second magnetic column 215 have opposite polarities, and an induced electromotive force induced on a portion of the secondary windings 230 wound around the third magnetic column 216 and an induced electromotive force induced on a portion of the secondary windings 230 wound around the fourth magnetic column 217 have opposite polarities. In addition, a current flows through one of a portion of the secondary windings 230 wound around the first magnetic column 214 and a portion of the secondary windings 230 wound around the second magnetic column 215 due to the induced electromotive force, and a current flows through one of a portion of the secondary windings 230 wound around the third magnetic column 216 and a portion of the secondary windings 230 wound around the fourth magnetic column 217 due to the induced electromotive force, wherein the induced electromotive force is generated by a current flowing through the primary windings.

Therefore, by designing the winding arrangement and electrical connections of the primary windings 220 and the secondary windings 230 on the magnetic core 210, two current doubler rectifying IM devices obtained by integration can cancel with each other initial AC magnetic flux passing through a center column of an E-type magnetic core provided in existing techniques, and thus the center column in the existing E-type magnetic core is able to be canceled, so as to greatly reduce a size of the IM device 200. Further, the cancellation of the center column may effectively reduce magnetic flux loss and significantly improve conversion efficiency of the entire IM device 200.

As described above, in FIGS. 2 and 5, the first primary winding 221 and the second primary winding 222 are electrically connected in series. The first secondary winding 231 is wound around the first magnetic column 214 and the second magnetic column 215, and the second secondary winding 232 is wound around the third magnetic column 216, and the fourth magnetic column 217. However, the present invention is not limited thereto. In some preferred embodiments of the present invention, the first secondary winding 231 is wound around any two of the first magnetic column 214, the second magnetic column 215, the third magnetic column 216, and the fourth magnetic column 217, and the second secondary winding 232 is wound around remaining two of the first magnetic column 214, the second magnetic column 215, the third magnetic column 216, and the fourth magnetic column 217. The first secondary winding 231 and the second secondary winding 232 are electrically connected in parallel.

Therefore, in practice, if the first primary winding 221 is wound around the first magnetic column 214 and the third magnetic column 216 in the same direction, and the second primary winding 222 is wound around the second magnetic column 215 and the fourth magnetic column 217 in a direction opposite to that of the first primary winding 221, when a voltage is applied to the primary windings 220, a current flows though one of a portion of the secondary windings 230 wound around the first magnetic column 214 and a portion of the secondary windings 230 wound around the third magnetic column 216 due to an induced electromotive force, and a current flows though one of a portion of the secondary windings 230 wound around the second magnetic column 215 and a portion of the secondary windings 230 wound around the fourth magnetic column 217 due to the induced electromotive force. In other words, a demagnetizing current is generated in one of the portion of the secondary windings 230 wound around the first magnetic column 214 and the portion of the secondary windings 230 wound around the third magnetic column 216, and a demagnetizing current is generated in one of the portion of the secondary windings 230 wound around the second magnetic post 215 and the portion of the secondary windings 230 wound around the fourth magnetic post 217.

Similarly, if the first primary winding 221 is wound around the first magnetic column 214 and the fourth magnetic column 217, and the second primary winding 222 is wound around the second magnetic column 215 and the third magnetic column 216, when a voltage is applied to the primary winding 220, a current flows though one of a portion of the secondary windings 230 wound around the first magnetic column 214 and a portion of the secondary windings 230 wound around the fourth magnetic column 217 due to an induced electromotive force, and a current flows though one of a portion of the secondary windings 230 wound around the third magnetic column 215 and a portion of the secondary windings 230 wound around the second magnetic column 216 due to the induced electromotive force.

In some preferred embodiments of the present invention, the secondary windings 230 may be electrically connected in series with rectifiers 240. According to the winding arrangement of the secondary windings 230 and the rectifiers 240, a current is able to be prevented from flowing through the secondary windings 230. Consequently, for two magnetic columns wound with the primary windings 220 in the same direction, current may not flow through the secondary windings 230 wound around the two magnetic columns concurrently. In following descriptions, diodes are referred to as an example to describe the rectifiers 240, however, the rectifiers 240 are not limited thereto. In some preferred embodiments of the present invention, the rectifiers 240 may be, for example, synchronous rectifier field effect transistors or other equivalent devices.

As shown in FIGS. 2 and 5, the first secondary winding 231 is wound around the first magnetic column 214 and the second magnetic column 215. It is assumed that the winding wound around the first magnetic column 214 is a first portion 231a of the first secondary winding 231, and the winding wound around the second magnetic column 214 is a second portion 231b of the first secondary winding 231. The first portion 231a of the first secondary winding 231 is electrically connected in parallel with the second portion 231b of the first secondary winding 231, the first portion 231a of the first secondary winding 231 is electrically connected in series with a first rectifier 241, and a second portion 231b of the first secondary winding 231 is electrically connected in series with a second rectifier 242.

In other words, in a preferred embodiment of the present invention, the first secondary winding 231 may include two sub-windings one of which corresponds to the first portion 231a, and the other of which corresponds to the second portion 231b, and the two sub-windings are respectively wound around the corresponding magnetic columns 213 and electrically connected in parallel. Similarly, the second secondary winding 232 may also include two sub-windings one of which corresponds to the first portion 232a, and the other of which corresponds to the second portion 232b, and the two sub-windings are respectively wound around the corresponding magnetic columns 213 are electrically connected in parallel.

Similarly, the second secondary winding 232 is wound around the third magnetic column 216 and the fourth magnetic column 217. It is assumed that the winding wound around the third magnetic column 216 is a first portion 232a of the second secondary winding 232, and the winding wound around the fourth magnetic column 217 is a second portion 232b of the second secondary winding 232. The first portion 232a of the second secondary winding 232 is electrically connected in parallel with the second portion 232b of the second secondary winding 232, the first portion 232a of the second secondary winding 232 is electrically connected in series with a third rectifier 243, and a second portion 232b of the second secondary winding 232 is electrically connected in series with a fourth rectifier 244.

In other words, in the above-described preferred embodiment, the rectifiers 240 correspond to the magnetic columns 213 respectively, the secondary windings 230 wound around each magnetic column 213 are electrically connected in parallel with each other, and electrically connected in series with the corresponding rectifiers 240 respectively.

In some preferred embodiments of the present invention, according to the winding arrangement of the first portion 231a and the second portion 231b of the first secondary winding 231, the winding arrangement of the first portion 232a and the second portion 232b of the second secondary winding 232, and the first rectifier 241, the second rectifier 242, the third rectifier 243 and the fourth rectifier 244, one of the first rectifier 241 and the second rectifier 242 is in an on-state due to the induced electromotive force, while the other is in an off-state, and one of the third rectifier 243 and the fourth rectifier 244 is in an on-state due to the induced electromotive force, while the other is in an off-state.

In some preferred embodiments of the present invention, based on the features shown in FIG. 2, when a voltage is applied to the primary windings to enable a current to flow from the end 220a into the primary windings and flow out from the end 220b, an induced electromotive force is induced on the secondary windings. For the first portion 231a of the first secondary winding 231, polarities of the induced electromotive force is negative on the left and positive on the right; for the second portion 231b of the first secondary winding 231, polarities of the induced electromotive force is positive on the left and negative on the right; for the first portion 232a of the second secondary winding 232, polarities of the induced electromotive force is positive on the left and negative on the right; and for the second portion 232b of the second secondary winding 232, polarities of the induced electromotive force is negative on the left and positive on the right. Due to the induced electromotive force described above, the first rectifier 241 and the fourth rectifier 244 are in an on-state, and the second rectifier 242 and the third rectifier 243 are in an off-state. On the other hand, when a voltage is applied to the primary windings to enable a current to flow from the end 220b into the primary windings and flow out from the end 220a, an induced electromotive force is generated in the secondary windings, which causes the first rectifier 241 and the fourth rectifier 244 to be in an on-state, and the second rectifier 242 and the third rectifier 243 to be in an off-state.

That is, in the case that the primary winding start end of the primary windings defines and functions as a first primary end of the IM device, the primary winding terminal end of the primary windings defines and functions as a second primary end of the IM device, and the IM device is electrically connected to a primary circuit, for example, a phase shift full bridge circuit, there are following two situations depending on the winding direction of the first secondary winding 231 and the features of the rectifier 240.

(1) When a voltage applied to the primary circuit is a positive half-cycle, the second rectifier 242 electrically connected in series with a portion of the secondary windings (for example, the second portion 231*b* of the first secondary winding) wound around the second magnetic column 215 and the third rectifier 243 electrically connected in series with a portion of the secondary windings (for example, the first portion 232*a* of the second secondary winding) wound around the third magnetic column 216 are in an off-state concurrently. The first rectifier 241 electrically connected in series with a portion of the secondary windings (for example, the first portion 231*a* of the first secondary winding) wound around the first magnetic column 214 and the fourth rectifier 244 electrically connected in series with a portion of the secondary windings (for example, the second portion 232*b* of the second secondary winding) wound around the fourth magnetic column 217 are in an on-state.

(2) When the voltage applied by the primary circuit is the secondary half cycle, the first rectifier 241 and the fourth rectifier 244 are in an off-state, and the second rectifier 242 and the third rectifier 243 are in an on-state.

With the features as shown in FIG. 5, when a voltage is applied to the primary windings 220 to enable a current to flow from the primary winding start end 220*a* into the primary windings 220 and flow out from the primary winding terminal end 220*b*, an inductive electromotive force is induced on the secondary windings 230, which causes the first rectifier 241 and the fourth rectifier 244 to be in an off-state and the second rectifier 242 and the third rectifier 243 to be in an on-state.

In addition, the diodes (i.e., the rectifiers 240) in FIGS. 2 and 5 may all be arranged in reverse, or, a winding direction of the second portion 231*b* of the first secondary winding 231 in FIG. 2 may be completely reversed and an installation direction of the second rectifier 242 may be changed accordingly. The corresponding rectifiers (for example, the first rectifier 241 and the second rectifier 242) corresponding to the two magnetic columns 213 (for example, the second magnetic column 214 and the third magnetic column 215) wound by the primary windings 220 in the same direction are preferably not in an on-state concurrently, for example, according to the four rectifiers 240 and the winding arrangement of the secondary windings 230.

In some preferred embodiments of the present invention, the first secondary winding 231 and the second secondary winding 232 may be respectively electrically connected with capacitors 250 to define structures of two transformers with the first primary winding 221 and the second primary winding 222 respectively.

It should be noted that in FIGS. 2 and 5, the first primary winding 221 is wound around the first magnetic column 214 and the second magnetic column 215 in the same direction, and the second primary winding 222 is wound around the third magnetic column 216 and the fourth magnetic column 217 in a direction opposite to the winding direction of the first primary winding 221, where the first secondary winding 231 is wound around the first magnetic column 214 and the second magnetic column 215, and the second secondary winding 232 is wound around the third magnetic column 216 and the fourth magnetic column 217. However, in some preferred embodiments of the present invention, the first secondary winding 231 and the first primary winding 221 may not be wound around the same two magnetic columns 213, and the second secondary winding 232 and the second primary winding 222 may not be wound around the same two magnetic columns 213 as well. For example, if the first primary winding 221 is wound around the first magnetic column 214 and the second magnetic column 215 in the same direction, and the second primary winding 222 is wound around the third magnetic column 216 and the fourth magnetic column 217 in a direction opposite to that of the first primary winding 221, the first secondary winding 231 may be wound around the first magnetic column 214 and the third magnetic column 216, and the second secondary winding 232 may be wound around the second magnetic column 215 and the fourth magnetic column 217. For the first primary winding 221 wound in the same direction around the first magnetic column 214 and the second magnetic column 215, and for the second primary winding 222 wound in the direction opposite to that of the first primary winding 221 around the third magnetic column 216 and the fourth magnetic column 217, the portion of the secondary windings 230 wound around the first magnetic column 214 and the portion of the secondary windings 230 wound around the second magnetic column 215 are preferably not in an on-state concurrently, and the portion of the secondary windings 230 wound around the third magnetic column 216 and the portion of the secondary windings 230 wound around the fourth magnetic column 217 are preferably not in an on-state concurrently, for example, according to the four rectifiers 240 and the winding arrangement of the secondary windings 230.

Figure 6:
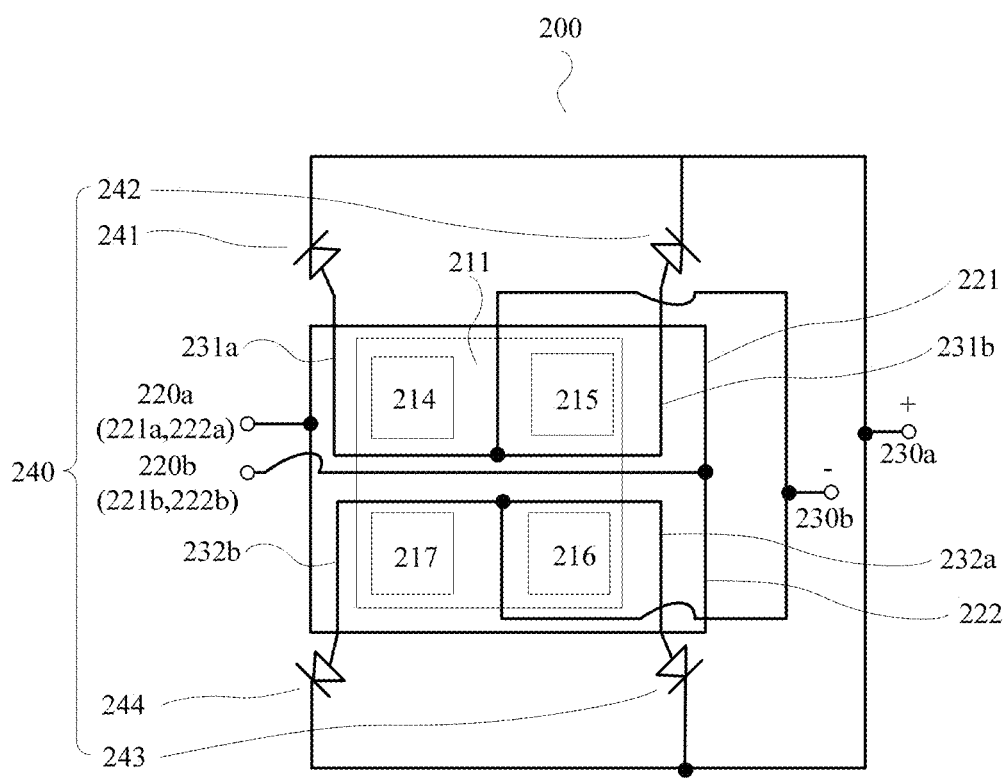
FIG. 6 shows a detailed structure of the IM device as shown in FIG. 2 according to another preferred embodiment of the present invention.

Referring to FIG. 6, in some preferred embodiments of the present invention, the first primary winding 221 and the second primary winding 222 may be electrically connected in parallel. In other words, the start end 221*a* of the first primary winding 221 and the start end 222*a* of the second primary winding 222 are the same end, and the terminal end 221*b* of the first primary winding 221 and the terminal end 222*b* of the second primary winding 222 are the same end. If the primary winding start end 220*a* is used as the start end and the primary winding terminal end 220*b* is used as the terminal end, the first primary winding 221 is wound around the first magnetic column 214 and the second magnetic column 215 clockwise, and the second primary winding 222 is wound around the third magnetic column 216 and the fourth magnetic column 217 counterclockwise.

In practice, a coil may be wound around the first magnetic column 214, the second magnetic column 215, the third magnetic column 216, and the fourth magnetic column 217 sequentially. A portion of the coil adjacent to or in a vicinity of the first magnetic column 214 is tapped as the primary winding start end 220*a*. A portion of the coil adjacent to or in a vicinity of a middle position between the second magnetic column 215 and the third magnetic column 216 is tapped as a first point. Another coil is coupled to the first point, and passes through the second magnetic column 215 and the third magnetic column 216, and then the first magnetic column 214 and the fourth magnetic column 217, and the terminal end of this coil defines and functions as the primary winding terminal end 220*b*.

In this way, the first primary winding 221 and the second primary winding 222 are provided. The start end 221*a* of the first primary winding 221, the start end 222*a* of the second primary winding 222 and the start end 220*a* of the primary windings are the same end, and the terminal end 221*b* of the first primary winding 221, the terminal end 222*b* of the second primary winding 222 and the terminal end 220*b* of the primary windings are the same end.

In FIG. 6, the first primary winding 221 is wound around the first magnetic column 214 and the second magnetic column 215 in the same direction, and the second primary winding 222 is wound around the third magnetic column 216 and the fourth magnetic column 217 in a direction opposite to the winding direction of the first primary winding 221. When the primary windings 220 are applied with a voltage to generate an induced electromotive force, the induced electromotive force causes only one of the first rectifier 241 electrically connected with the secondary windings 230 wound around the first magnetic column 214 and the second rectifier 242 electrically connected with the secondary windings 230 wound around the second magnetic column 215 to be in an on-state, and causes one of the third rectifier 243 electrically connected with the secondary windings 230 wound around the third magnetic column 216 and the fourth rectifier 244 electrically connected with the secondary windings 230 wound around the fourth magnetic column 217 to be in an on-state. That is, when the induced electromotive force is generated on the primary windings 220 applied with the voltage, only the secondary windings 230 corresponding to two magnetic columns 213 have a current flowing concurrently, and the two magnetic columns 213 wound by the secondary windings 230 having the current flowing concurrently must not be two magnetic columns 213 wound by the primary windings 220 in the same direction.

In the above-described preferred embodiment, the first primary winding 221 is wound around the first magnetic column 214 and the second magnetic column 215, and the second primary winding 222 is wound around the third magnetic column 216 and the fourth magnetic column 217. In other preferred embodiments of the present invention, the first primary winding 221 may be wound around two magnetic columns 213 provided on one diagonal of a rectangle, and the second primary winding 222 may be wound around two magnetic columns 213 provided on the other diagonal of the rectangle.

Figure 7:
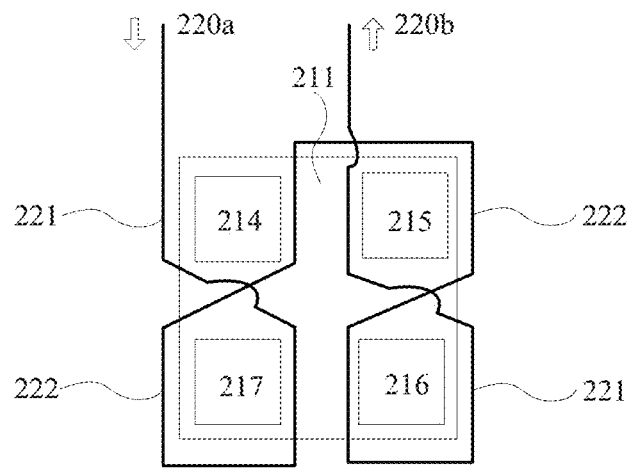
FIG. 7 shows a detailed structure of primary windings in the IM device as shown in FIG. 2 according to a preferred embodiment of the present invention.

FIG. 7 shows a detailed structure of primary windings in the IM device as shown in FIG. 2 according to a preferred embodiment of the present invention. Referring to FIG. 7, the first primary winding 221 may be wound around the first magnetic column 214 and the third magnetic column 216, and the second primary winding 222 may be wound around the second magnetic column 215 and the fourth magnetic column 217.

Specifically, a coil may be wound according to an angle as shown in FIG. 7. The coil is wound from the left of the first magnetic column 214 to the right of the fourth magnetic column 217, then wound around the fourth magnetic column 217 from the lower-right of the fourth magnetic column 217 to the upper-left of the fourth magnetic column 217, then wound from the upper-left of the fourth magnetic column 217 to the right of the first magnetic column 214, then wound from the upper-left of the first magnetic column 214 to the right of the second magnetic column 215, then wound from the lower-right of the second magnetic column 215 to the left of the third magnetic column 216, then wound around the third magnetic column 216 from the left of the third magnetic column 216 to the right of the third magnetic column 216, and then wound from the upright of the third magnetic column 216 to the upright of the second magnetic column 215. In this way, the first primary winding 221 wound counterclockwise and the second primary winding 222 wound clockwise following the angle as shown in FIG. 7 are provided. Besides, the first primary winding 221 and the second primary winding 222 are electrically connected in series.

Figure 8:
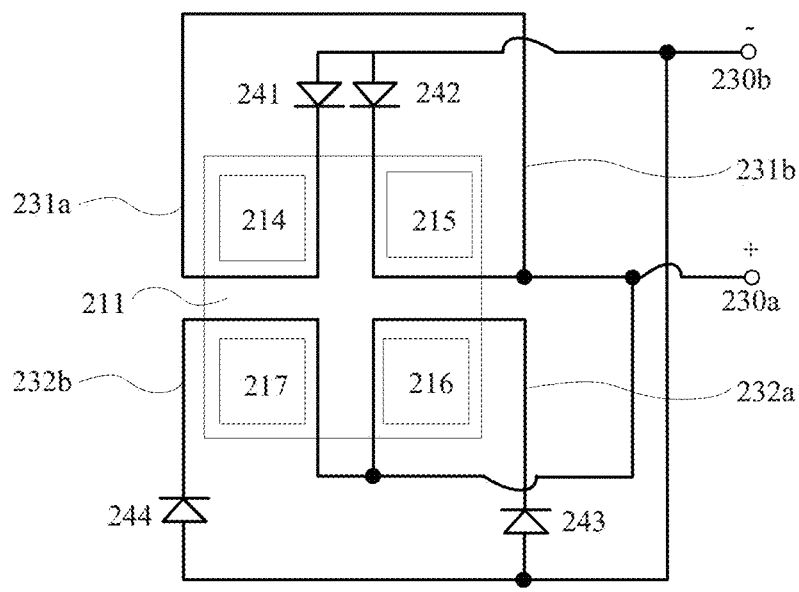
FIG. 8 shows a detailed structure of secondary windings in the IM device as shown in FIG. 2 according to a preferred embodiment of the present invention.

FIG. 8 shows a detailed structure of secondary windings in the IM device as shown in FIG. 2 according to a preferred embodiment of the present invention. On a primary side (that is, the primary windings 220), the winding arrangement shown in FIG. 7 is provided, and on a secondary side (that is, the secondary windings 230), the features shown in FIG. 8 are provided. The primary windings 220 wound around the first magnetic column 214 and the third magnetic column 216 are all counterclockwise. Therefore, on the secondary winding 230 side, the first rectifier corresponding to the first magnetic column 214 and the third rectifier 243 corresponding to the third magnetic column 216 cannot be in an on-state concurrently. Specifically, when a voltage is applied to the primary windings 220 and a current flows in from the primary winding start end 220a and flows out from the primary winding terminal end 220b, a current is generated at the secondary side due to an induced electromotive force. With the structure in FIG. 8, the first rectifier 241 and the second rectifier 242 are in an on-state, and the third rectifier 243 and the fourth rectifier 244 are in an off-state. When a voltage is applied to the primary windings 220 and a current flows in from the primary winding terminal end 220b and flows out from the primary winding start end 220a, a current is generated at the secondary side due to an induced electromotive force. With the structure in FIG. 8, the first rectifier 241 and the second rectifier 242 are in an off-state, and the third rectifier 243 and the fourth rectifier 244 are in an on-state.

Figure 9:
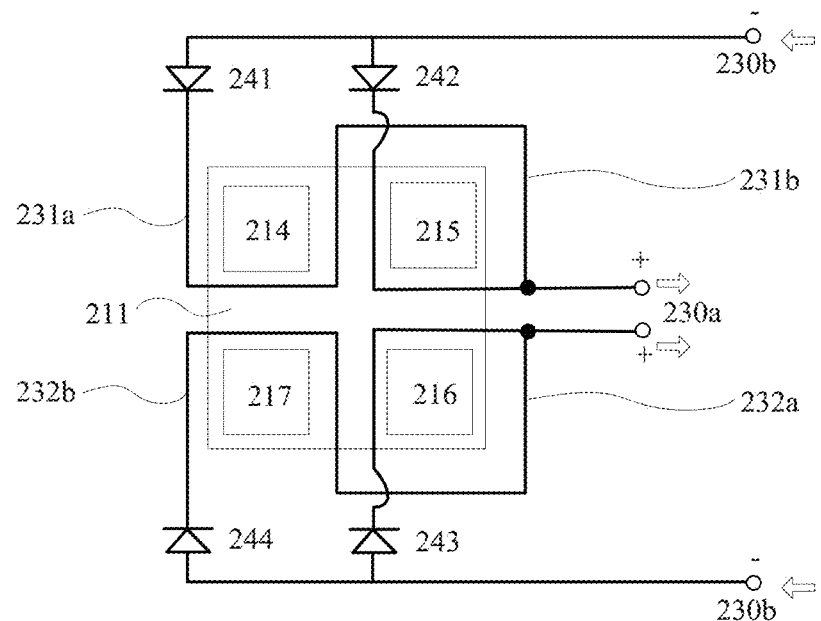
FIG. 9 shows a detailed structure of secondary windings in the IM device as shown in FIG. 2 according to a preferred embodiment of the present invention.

FIG. 9 shows a detailed structure of secondary windings in the IM device as shown in FIG. 2 according to another preferred embodiment of the present invention. On the primary side, the winding arrangement shown in FIG. 7 is provided, and on the secondary side, the features shown in FIG. 9 are provided. The primary windings 220 wound around the first magnetic column 214 and the third magnetic column 216 are all counterclockwise. Therefore, on the secondary winding 230 side, the first rectifier corresponding to the first magnetic column 214 and the third rectifier 243 corresponding to the third magnetic column 216 cannot be in an on-state concurrently. Specifically, when a voltage is applied to the primary windings 220 and a current flows in from the primary winding start end 220a and flows out from the primary winding terminal end 220b, a current is generated at the secondary side due to an induced electromotive force. With the structure in FIG. 10, the first rectifier 241 and the fourth rectifier 244 are in an on-state, and the second rectifier 242 and the third rectifier 243 are in an off-state. When a voltage is applied to the primary windings 220 and a current flows in from the primary winding terminal end 220b and flows out from the primary winding start end 220a, a current is generated at the secondary side due to an induced electromotive force. With the structure of FIG. 9, the first rectifier 241 and the fourth rectifier 244 are in an off-state, and the second rectifier 242 and the third rectifier 243 are in an on-state.

In other words, there are the following two situations depending on the winding directions of the secondary windings 230 and the features of the rectifiers 240 as shown in FIGS. 8 and 9 which are designed for the winding arrangement of the primary windings in FIG. 7.

(1) When a voltage applied to the primary circuit is a positive half-cycle, the first rectifier 241 and the second rectifier 242 corresponding to the second magnetic column 215 are in an on-state concurrently, and the third rectifier 243 and the fourth rectifier 244 corresponding to the fourth magnetic column 217 are in an off-state. When a voltage applied to the primary circuit is a negative half-cycle, the third rectifier 243 and the fourth rectifier 244 are in an on-state concurrently, and the first rectifier 241 and the second rectifier 242 are in an off-state (corresponding to FIG. 8).

(2) When a voltage applied to the primary circuit is a positive half-cycle, the first rectifier 241 and the fourth rectifier 244 are in an on-state concurrently, and the second rectifier 242 and the third rectifier 243 are in an off-state. When a voltage applied to the primary circuit is a negative half-cycle, the second rectifier 242 and the third rectifier 243 are in an on-state concurrently, and the first rectifier 241 and the fourth rectifier 244 are in an off-state (corresponding to FIG. 9).

That is, the rectifiers 240 (for example, the first rectifier 241 and the third rectifier 243) corresponding to the two magnetic columns 214 (for example, the first magnetic column 214 and the third magnetic column 216) wound by the primary windings 220 in the same direction are not in an on-state concurrently.

Figure 10:
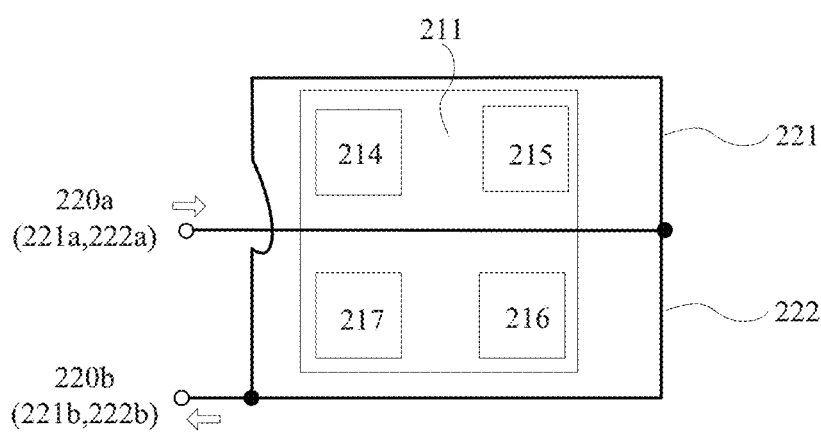
FIG. 10 shows a detailed structure of primary windings in the IM device as shown in FIG. 2 according to a preferred embodiment of the present invention.

FIG. 10 shows a detailed structure of primary windings in the IM device as shown in FIG. 2 according to another preferred embodiment of the present invention. Referring to FIG. 10, when the first primary winding 221 and the second primary winding 222 are electrically connected in parallel, two taps may be drawn from a coil passing through the middle between the first magnetic column 214 and the fourth magnetic column 217, and passing through the middle between the second magnetic column 215 and the third magnetic column 216. One of the two taps is wound upward from the second magnetic column 215 to the first magnetic column 214 according to the angle shown in FIG. 10, the other of the two taps is wound downward from the third magnetic column 216 to the fourth magnetic column 217 according to the angle shown in FIG. 10, where the two portions are converged to define the first primary winding 221 and the second primary winding 222 with opposite winding directions and electrically connected in parallel.

Figure 11:
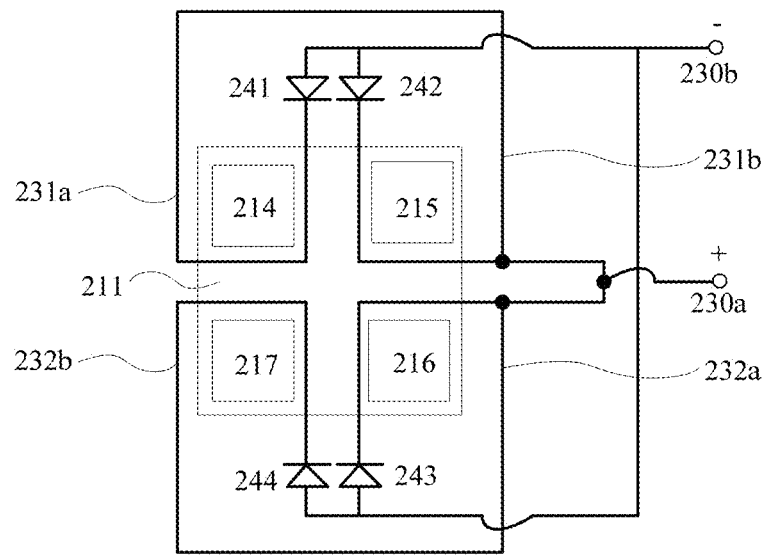
FIG. 11 shows a detailed structure of secondary windings in the IM device as shown in FIG. 2 according to a preferred embodiment of the present invention.
Figure 12:
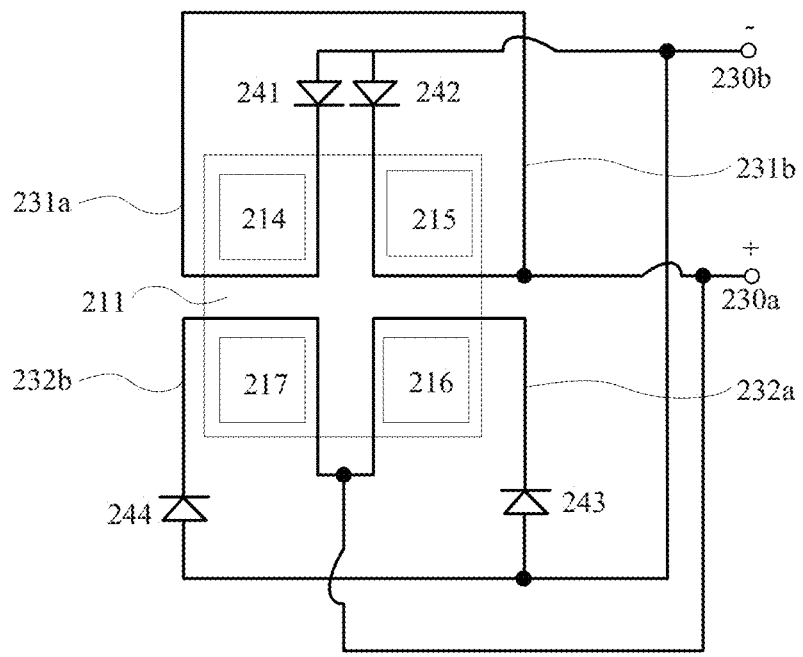
FIG. 12 shows a detailed structure of secondary windings in the IM device as shown in FIG. 2 according to a preferred embodiment of the present invention.

Similarly, when a structure shown in FIG. 10 is provided on the primary side, a structure shown in FIG. 11 or 12 may be provided on the secondary side. According to the structure shown in FIGS. 11 and 12, the first rectifier 241 corresponding to the first portion 231a of the first secondary winding 231 and the second rectifier 242 corresponding to the second portion 231b of the first secondary winding 231 are not in an on-state concurrently, and the third rectifier 243 corresponding to the first portion 232a of the second secondary winding 232 and the fourth rectifier 244 corresponding to the second portion 232b of the second secondary winding 232 are not in an on-state concurrently.

Figure 13:
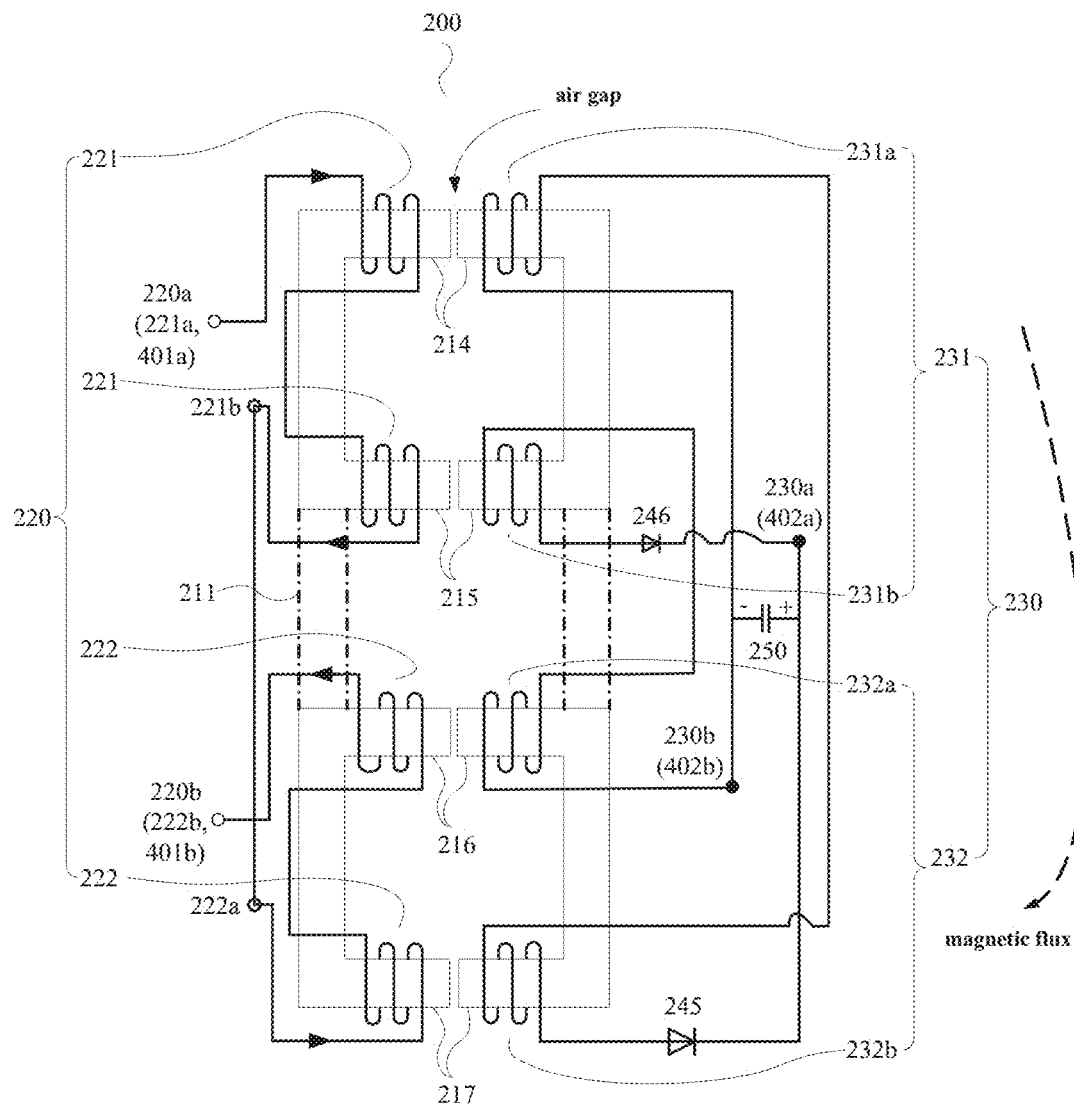
FIG. 13 shows a principle diagram of an IM device according to a preferred embodiment of the present invention.
Figure 14:
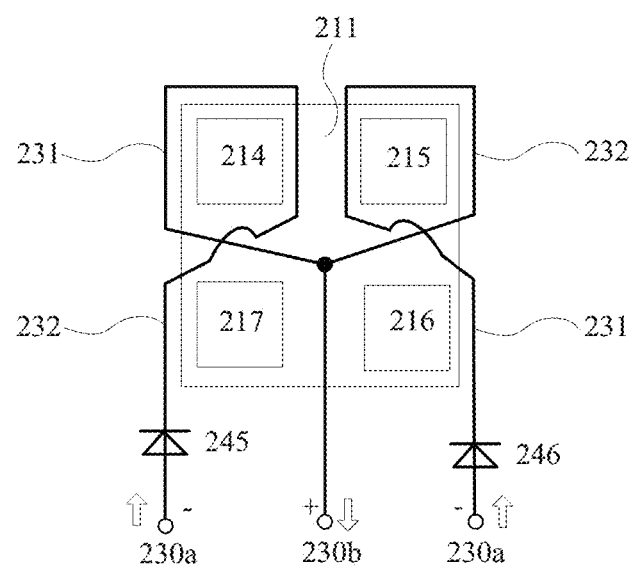
FIG. 14 shows a detailed structure of secondary windings in the IM device as shown in FIG. 13 according to a preferred embodiment of the present invention.

Referring to FIGS. 13 and 14, in some preferred embodiments of the present invention, the first primary winding 221 is also wound around the first magnetic column 214 and the second magnetic column 215, and the second primary winding 222 is also wound around the third magnetic column 216 and the fourth magnetic column 217. The first primary winding 221 and the second primary winding 222 are electrically connected in series.

Referring to FIGS. 13 and 14, the secondary windings 230 may include the first secondary winding 231 and the second secondary winding 232. The first secondary winding 231 may be wound around the first magnetic column 214 and the fourth magnetic post 217, and the second secondary winding 232 may be wound around the second magnetic column 215 and the third magnetic column 216. In addition, the first secondary winding 231 and the second secondary winding 232 are electrically connected in parallel.

Further, the first secondary winding 231 is electrically connected in series with a fifth rectifier 245, and the second secondary winding 232 is electrically connected in series with a sixth rectifier 246.

Further, according to the winding arrangement of the first secondary winding 231 and the second secondary winding 232, the fifth rectifier 245 and the sixth rectifier 246, one of the fifth rectifier 245 and the sixth rectifier 246 is caused to be in an on-state by an induced electromotive force, and the other of the fifth rectifier 245 and the sixth rectifier 246 is in an off-state. Thus, a current may flow through the first magnetic column 214 and the fourth magnetic column 217 due to the induced electromotive force generated on the primary windings 220, or, a current may flow through the second magnetic column 215 and the third magnetic column 216 due to the induced electromotive force generated on the primary windings 220. That is, a demagnetizing current is generated in one of a portion of the secondary windings 230 wound around the first magnetic column 214 and a portion of the secondary windings 230 wound around the second magnetic column 215, and a demagnetizing current is generated in one of a portion of the secondary windings 230 wound around the third magnetic column 216 and a portion of the secondary windings 230 wound around the fourth magnetic column 217.

Alternatively, the first secondary winding 231 may be wound around the first magnetic column 214 and the third magnetic column 216, and the second secondary winding 232 may be wound around the second magnetic column 215 and the first magnetic column 215. In addition, the fifth rectifier 245 may be electrically connected in series with a lead-out end of a coil of the first secondary winding 231 wound around the third magnetic column 216, and the sixth rectifier 246 may be electrically connected in series with a lead-out end of a coil of the second secondary winding 232 wound around the second magnetic column 215. The lead-out end may be a terminal end or a start end of the corresponding secondary winding 230.

Figure 15:
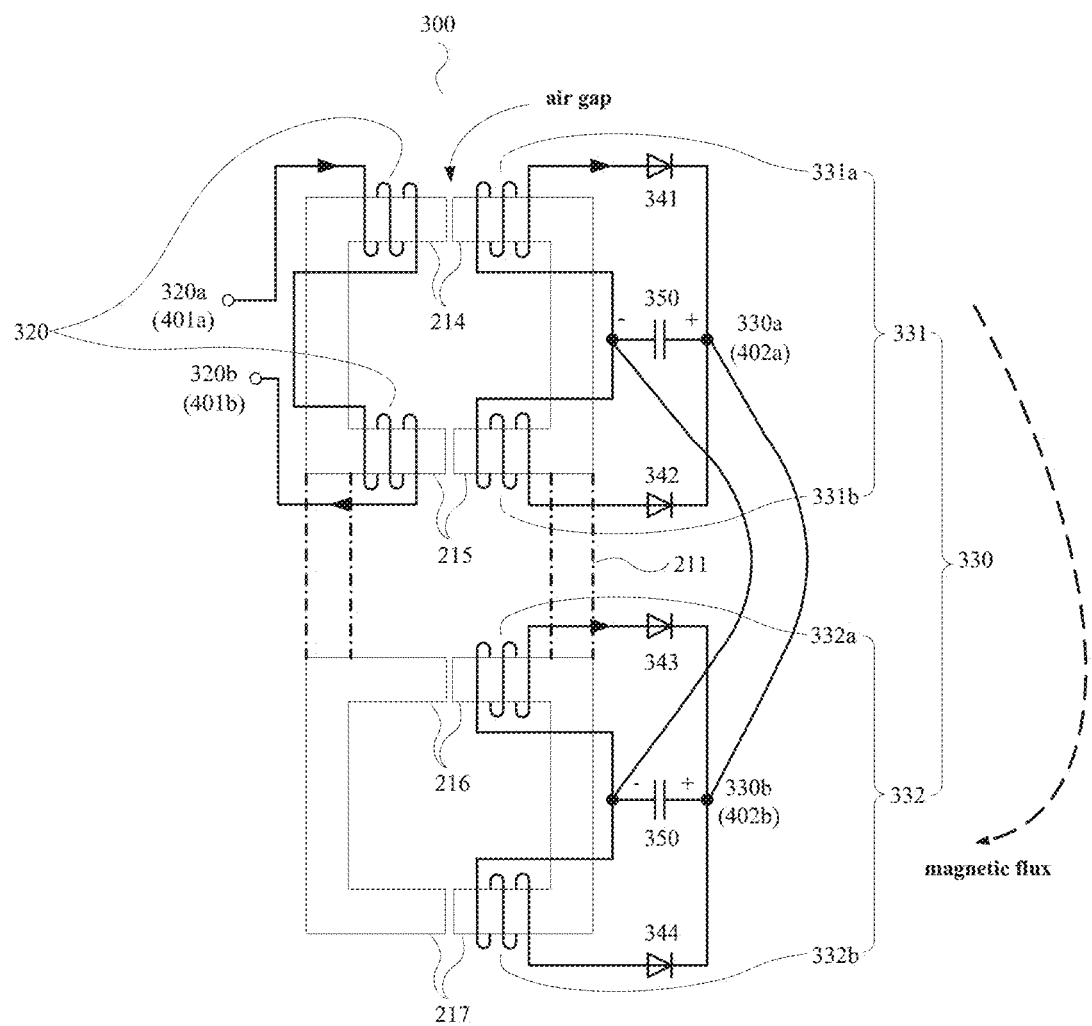
FIG. 15 shows a principle diagram of an IM device according to a preferred embodiment of the present invention.
Figure 16:
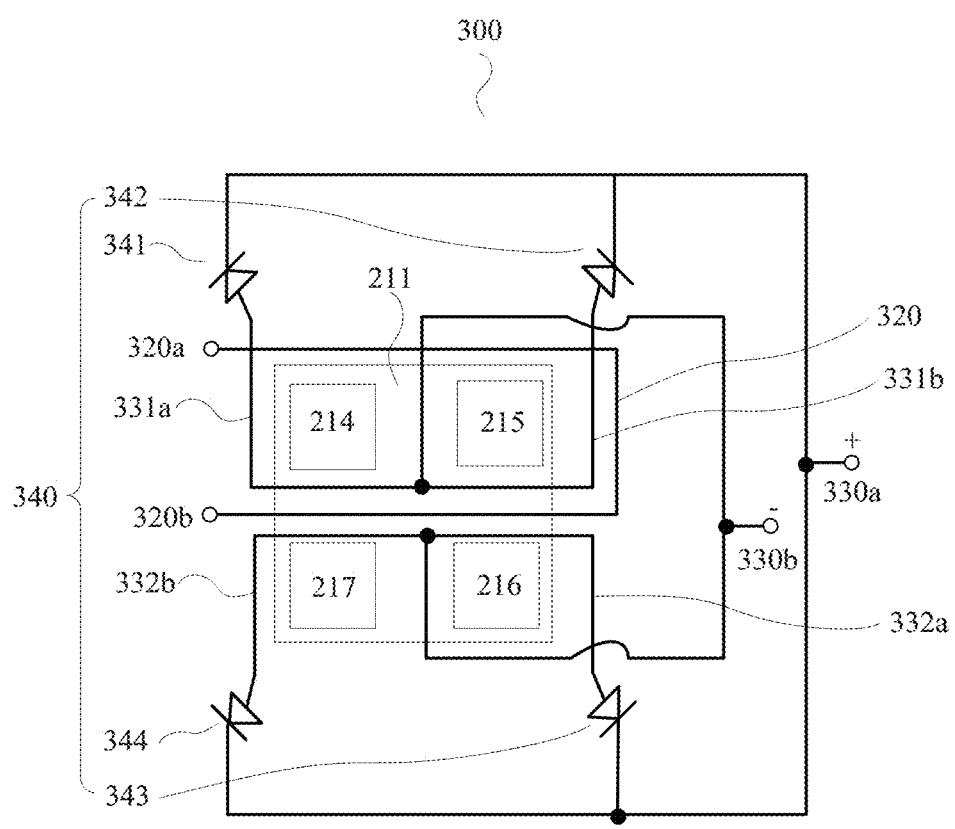
FIG. 16 shows a detailed structure of the IM device as shown in FIG. 15 according to a preferred embodiment of the present invention.

FIG. 15 shows a principle diagram of an IM device 300 according to another preferred embodiment of the present invention, and FIG. 16 shows a detailed structure of the IM device 300 as shown in FIG. 15. In following descriptions, merely a difference of the IM device 300 with the above-described preferred embodiments of FIG. 2 is described.

Referring to FIG. 15, the IM device 300 includes a magnetic core 210, a primary winding 320 and secondary windings 330.

Detailed structures of the magnetic core 210 may be referred to the above descriptions of the magnetic core 210 shown in FIGS. 3 and 4, and are not described in detail here. The magnetic core 210 may include a first magnetic column 214, a second magnetic column 215, a third magnetic column 216, and a fourth magnetic column 217.

Further, referring to FIG. 15, the primary winding 320 and the secondary windings 330 may be wound at any position of the magnetic columns 213 to define a closed magnetic flux loop. Therefore, the primary winding 320 and the secondary windings 330 wound in the same direction around the magnetic columns can produce a magnetic coupling effect. The closed magnetic flux loop circulates in the entire IM device 300 along a direction of a dotted arrow shown in FIG. 15.

The difference between the preferred embodiment in FIG. 15 and the above-described preferred embodiment in FIG. 2 mainly lies in that, the primary winding is wound merely around any two of the first magnetic column 214, the second magnetic column 215, the third magnetic column 216 and the fourth magnetic column 217 in a same winding direction.

For example, in FIG. 15, the primary winding 320 is wound around the first magnetic column 214 and the second magnetic column 215 in the same winding direction. However, the primary winding 320 may be wound around the first magnetic column 214 and the third magnetic column 216 in a same winding direction, or may be wound around the first magnetic column 214 and the fourth magnetic column 217 in a same winding direction.

Further, the secondary windings 330 may be wound around the first magnetic column 214, the second magnetic column 215, the third magnetic column 216, and the fourth magnetic column 217. Refer to FIG. 15 as an example. When a voltage is applied to the primary winding 320, a current flows through one of a portion of the secondary windings 330 wound around the first magnetic column 214 and a portion of the secondary windings 330 wound around the second magnetic column 215 due to an induced electromotive force, while the other of the two portions is not flowed with a current. In addition, a current flows through one of a portion of the secondary windings 330 wound around the third magnetic column 216 and a portion of the secondary windings 330 wound around the fourth magnetic column 217 due to the induced electromotive force, while the other of the two portions is not flowed with a current. That is, a demagnetizing current is generated in one of the portion of the secondary windings 330 wound around the first magnetic column 214 and the portion of the secondary windings 330 wound around the second magnetic column 215, and a demagnetizing current is generated in one of the portion of the secondary windings 330 wound around the third magnetic column 216 and the portion of the secondary windings 330 wound around the fourth magnetic column 217.

Therefore, by winding the windings on the four magnetic columns 213, one primary winding 320 and multiple secondary windings 330 are obtained, thus equivalently integrating two IM devices (each of the IM devices corresponds to an existing transformer and an output inductor of a current doubler rectifier) in one IM device 300. Although the third magnetic column and the fourth magnetic column are not wound with the primary winding, a current also flows through them due to the induced electromotive force generated on the primary winding wound around the first magnetic column and the second magnetic column, which provides an effect of the third magnetic column and the fourth magnetic column being wound with the primary winding.

Further, with the winding arrangement of the primary winding 320 and the secondary windings 330 around the magnetic core 210, reverse magnetic flux of two IM devices after the integration can cancel each other, and thus a center column in an existing E-shaped magnetic core is able to be canceled. This greatly reduces a size of the IM device 300. In addition, the cancellation of the center column may effectively reduce magnetic flux loss and significantly improve conversion efficiency of the entire IM device 300.

In practice, if the primary winding 220 is wound around the first magnetic column 214 and the third magnetic column 216, when a voltage is applied to the primary winding 220, a current flows through one of a portion of the secondary windings 330 wound around the first magnetic column 214 and a portion of the secondary windings 330 wound around the third magnetic column 216 due to the induced electromotive force, while the other of the two portions does not have a current flowing.

Similarly, if the primary winding 220 is wound around the first magnetic column 214 and the fourth magnetic column 217, when a voltage is applied to the primary winding 220, a current flows through one of a portion of the secondary windings 330 wound around the first magnetic column 214 and a portion of the secondary windings 330 wound around the fourth magnetic column 217 due to the induced electromotive force, while the other of the two portions does not have a current flowing.

Further, two portions of the secondary windings 330 that are in an on-state concurrently may be electrically connected in series or in parallel.

Further, the secondary windings 330 may be electrically connected in series with rectifiers 340. According to the winding arrangement of the secondary windings 330 and the rectifiers 340, a current is able to be prevented from flowing through the secondary windings 330, to ensure that the secondary windings 330 wound around the two magnetic columns 213 wound with the primary winding 320 in the same direction are not in an on-state concurrently.

Further, the secondary windings 330 may include a first secondary winding 331 and a second secondary winding 332. The first secondary winding 331 may be wound around any two of the first magnetic column 214 and the second magnetic column 215, the third magnetic column 216 and the fourth magnetic column 217, and the second secondary winding 332 may be wound around remaining two of the first magnetic column 214, the second magnetic column 215, the third magnetic column 216 and the fourth magnetic column 217.

Further, the first secondary winding 331 and the second secondary winding 332 may be electrically connected in parallel.

Further, referring to FIGS. 15 and 16, the first secondary winding 331 is wound around the first magnetic column 214 and the second magnetic column 215. It is assumed that a portion of the first secondary winding 331 wound around the first magnetic column 214 is a first portion 331a, and a portion of the first secondary winding 331 wound around the second magnetic column 215 is a second portion 331b. Specifically, the first portion 331a of the first secondary winding 331 is electrically connected in parallel with the second portion 331b of the first secondary winding 331, the first portion 331a of the first secondary winding 331 is electrically connected in series with the first rectifier 341, and the second portion 331b of the first secondary winding 331 is electrically connected in series with the second rectifier 342.

In other words, in a preferred embodiment of the present invention, the first secondary winding 331 may include two sub-windings one of which corresponds to the first portion 331a and the other of which corresponds to the second portion 331b, and the two sub-windings are respectively wound around the corresponding magnetic columns 213 and electrically connected in parallel. Similarly, the second secondary winding 332 may also include two sub-windings one of which corresponds to the first portion 332a and the other of which corresponds to the second portion 332b, and the two sub-windings are respectively wound around the corresponding magnetic columns 213 and electrically connected in parallel.

Similarly, the second secondary winding 332 is wound around the third magnetic column 216 and the fourth magnetic column 217. It is assumed that a portion of the second secondary winding 332 wound around the third magnetic column 216 is a first portion 332a, and a portion of the second secondary winding 332 wound around the fourth magnetic column 217 is a second portion 332b. Specifically, the first portion 332a of the second secondary winding 332 is electrically connected in parallel with the second portion 332b of the second secondary winding 332, the first portion 332a of the second secondary winding 332 is electrically connected in series with the third rectifier 343, and the second portion 332b of the second secondary winding 332 is electrically connected in series with the fourth rectifier 344.

In other words, in the above-described preferred embodiment, the rectifiers 340 correspond to the magnetic columns 213 respectively, the secondary windings 330 wound around each magnetic column 213 are electrically connected in parallel with each other, and electrically connected in series with the corresponding rectifiers 340 respectively.

Further, with the winding arrangement of the first portion 331a and the second portion 331b of the first secondary winding 331, the winding arrangement of the first portion 332a and the second portion 332b of the second secondary winding 332, and the features of the first rectifier 341, the second rectifier 342, the third rectifier 343 and the fourth rectifier 344, one of the first rectifier 341 and the second rectifier 342 is caused to be in an on-state due to the induced electromotive force while the other of the first rectifier 341 and the second rectifier 342 is in an off-state, and one of the third rectifier 343 and the fourth rectifier 344 is caused to be in an on-state due to the induced electromotive force while the other of the third rectifier 343 and the fourth rectifier 344 is in an off-state.

Referring to FIGS. 15 and 16, when a voltage is applied to the primary winding 220 and a current flows from the primary winding start end 320a into the primary winding 220 and flows out from the primary winding terminal end 320b, on a secondary side, the second rectifier 342 and the third rectifier 343 are in an on-state, and the first rectifier 341 and the fourth rectifier 344 are in an off-state.

Further, the rectifiers 340 may be diodes, synchronous rectifier field effect transistors or other equivalent devices.

Further, the first secondary winding 331 and the second secondary winding 332 may be respectively electrically connected with a capacitor 350 to define structures of two transformers with the primary winding 320.

It should be noted that FIG. 15 shows the case where the primary winding 320 and the first secondary winding 331 are wound around the same two magnetic columns, that is, the primary winding 320 is wound around the first magnetic column 214 and the second magnetic column 215, the first secondary winding 331 is wound around the first magnetic column 214 and the second magnetic column 215 in the same winding direction of the primary winding 320, and the second secondary winding 332 is wound around the third magnetic column 216 and fourth magnetic column 217. However, in some preferred embodiments of the present invention, the primary winding 320 and the first secondary winding 331 or the second secondary winding 332 may not be wound around the same two magnetic columns 213. For example, if the primary winding 320 is wound around the first magnetic column 214 and the second magnetic column 215, the first secondary winding 331 may be wound around the first magnetic column 214 and the third magnetic column 216, and the second secondary winding 332 may be wound around the second magnetic column 215 and the fourth magnetic column 217. For the case where the first secondary winding 331 is wound around the first magnetic column 214 and the second magnetic column 215 in the same direction, the portion of the secondary windings 330 wound around the first magnetic column 214 and the portion of the secondary windings 330 wound around the second magnetic column 215 are preferably not in an on-state concurrently, for example, according to the four rectifiers 340 and the winding arrangement of the secondary windings 330.

In some preferred embodiments of the present invention, for a case where the first secondary winding 331 is wound around the first magnetic column 214 and the second magnetic column 215 in the same direction, the first secondary winding 331 and the second secondary winding 332 may be wound in parallel around the first magnetic column 214, the second magnetic column 215, the third magnetic column 216, and the fourth magnetic column 217 as shown in FIG. 11.

Figure 17:
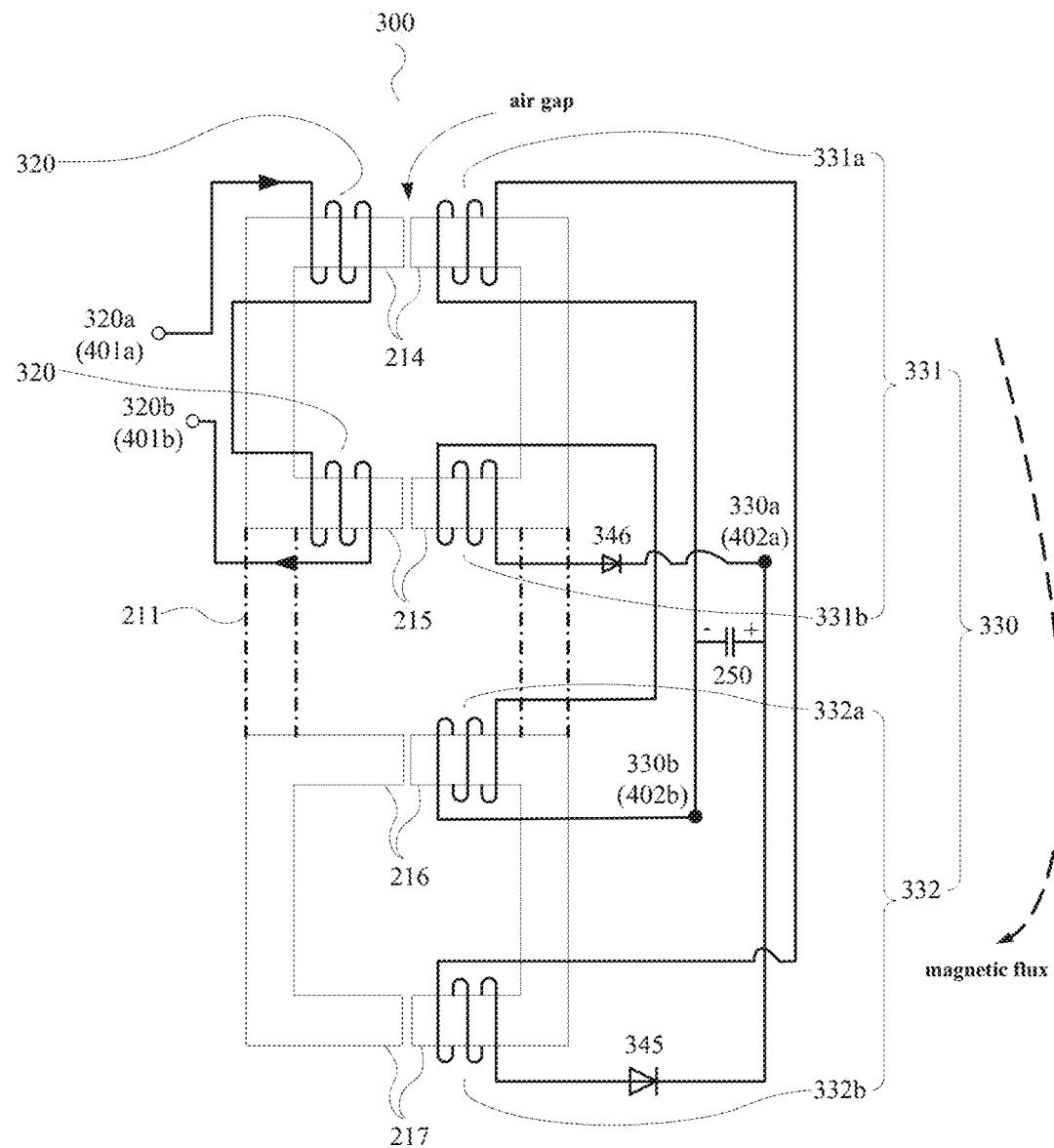
FIG. 17 shows a principle diagram of an IM device according to a preferred embodiment of the present invention.

Referring to FIG. 17, in a preferred embodiment of the present invention, the primary winding 320 is still wound around the first magnetic column 214 and the second magnetic column 215.

Specifically, referring to FIG. 17, the secondary windings 330 may include a first secondary winding 331 and a second secondary winding 332, the first secondary winding 331 may be wound around the first magnetic column 214 and the fourth magnetic column 217, and the second secondary winding 332 may be wound around the second magnetic column 215 and the third magnetic column 216. Besides, the first secondary winding 331 and the second secondary winding 332 are electrically connected in parallel.

Further, the first secondary winding 331 is electrically connected in series with the fifth rectifier 345, and the second secondary winding 332 is electrically connected in series with the sixth rectifier 346.

Further, with the winding arrangement of the first secondary winding 331 and the second secondary winding 332, and the features of the fifth rectifier 345 and the sixth rectifier 346, one of the fifth rectifier 345 and the sixth rectifier 346 is caused to be in an on-state due to the induced electromotive force, while the other of the fifth rectifier 345 and the sixth rectifier 346 is in an off-state. Thereby, a current flows through the first magnetic column 214 and the fourth magnetic column 217 due to the induced electromotive force generated on the primary winding 320, or a current flows through the second magnetic column 215 and the third magnetic column 216 due to the induced electromotive force generated on the primary winding 320, to ensure that a current does not flow through the first magnetic column 214 and the second magnetic column 215 concurrently, and that a current does not flow through the third magnetic column 216 and the fourth magnetic column 217 concurrently.

Alternatively, the first secondary winding 331 may be wound around the first magnetic column 214 and the third magnetic column 216, and the second secondary winding 332 may be wound around the second magnetic column 215 and the fourth magnetic column 217. In this case, the fifth rectifier 345 may be electrically connected in series with a lead-out end of a coil of the first secondary winding 331 wound around the third magnetic column 216, and the sixth rectifier 346 may be electrically connected in series with a lead-out end of a coil of the second secondary winding 332 wound around the second magnetic column 215. The lead-out terminal may be a terminal end or a start end of the corresponding secondary winding 330.

Figure 18:
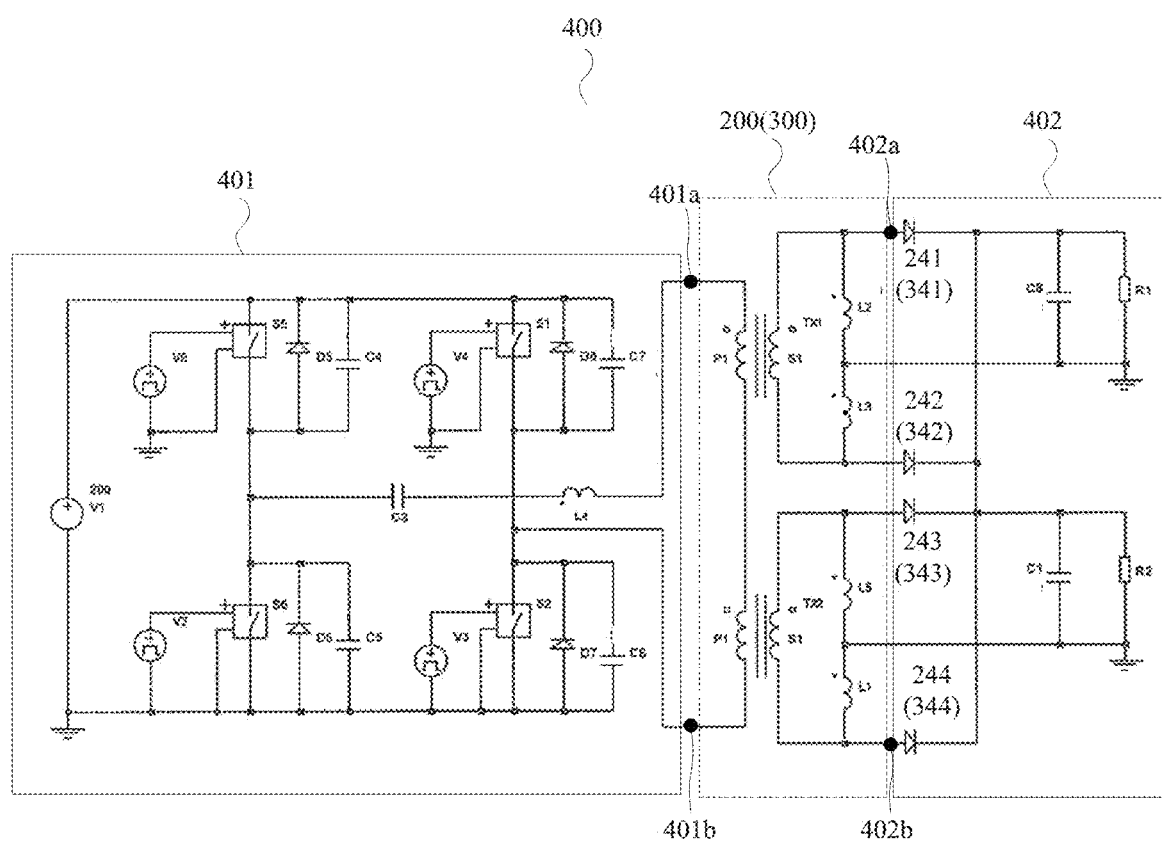
FIG. 18 shows a diagram of a DC-DC converter according to a preferred embodiment of the present invention.

FIG. 18 shows a diagram of a DC-DC converter 400 according to a preferred embodiment of the present invention.

In some preferred embodiments of the present invention, the DC-DC converter 400 may include the IM device 200 as shown in FIG. 2 or the IM device 300 as shown in FIG. 15.

Take the IM device 200 as an example, the primary winding start end 220a of the IM device 200 defines and functions as a first primary end 401a of the IM device 200, and the primary winding terminal end 220b of the IM device 200 defines and functions as a second primary end 401b of the IM device 200.

In some preferred embodiments of the present invention, the DC-DC converter 400 may further include a primary circuit 401 coupled to the first primary end 401a and the second primary end 401b of the IM device 200.

In some preferred embodiments of the present invention, the primary circuit 401 is selected from a group consisting of a half bridge converter, a full bridge converter and an LLC converter. In FIG. 18, the full bridge converter is shown, for example.

In some preferred embodiments of the present invention, the secondary winding start end 230a of the IM device 200 defines and functions as a first secondary end 402a of the IM device 200, and the secondary winding terminal end 230b of the IM device 200 defines and functions as a second secondary end 402b of the IM device 200.

In some preferred embodiments of the present invention, the DC-DC converter 400 may further include a secondary circuit 402 coupled to the first secondary end 402a and the second secondary end 402b of the IM device 200.

In some preferred embodiments of the present invention, the secondary circuit 402 is a current doubler rectifier circuit.

In preferred embodiments of the present invention, with windings of coils on the IM device 200 or 300, an effect of an inductor being integrated in the IM device 200 or 300 may be provided.

Therefore, with the structures of the IM device 200 or 300 as described above, a size of the DC-DC converter 400 may be reduced, which enables the DC-DC converter to possess larger power with a smaller size and lower cost.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An integrated magnetic (IM) device, comprising:
a magnetic core;
primary windings; and
secondary windings; wherein
the magnetic core includes a base plate, a cover plate, and magnetic columns between the base plate and the cover plate;
the primary windings and the secondary windings are respectively wound around the magnetic columns to define a closed magnetic flux loop;
the magnetic columns include a first magnetic column, a second magnetic column, a third magnetic column, and a fourth magnetic column;
the primary windings include a first primary winding and a second primary winding, wherein the first primary winding is wound around the first magnetic column and the second magnetic column, the second primary winding is wound around the third magnetic column and the fourth magnetic column, a winding direction of the first primary winding is opposite to a winding direction of the second primary winding, and the first primary winding and the second primary winding are electrically connected in series or in parallel;
the secondary windings are wound around the first magnetic column, the second magnetic column, the third magnetic column and the fourth magnetic column;
when a voltage is applied to the primary windings, a current flows through one of a portion of the secondary windings wound around the first magnetic column and a portion of the secondary windings wound around the second magnetic column due to an induced electromotive force, and a current flows through one of a portion of the secondary windings wound around the third magnetic column and a portion of the secondary windings wound around the fourth magnetic column due to the induced electromotive force, wherein the induced electromotive force is generated by a current flowing through the primary windings;
the primary windings include a primary winding start end and a primary winding terminal end, the primary winding start end is a first primary end of the IM device, and the primary winding terminal end is a second primary end of the IM device; and
the secondary windings include a secondary winding start end and a secondary winding terminal end, the secondary winding start end is a first secondary end of the IM device, and the secondary winding terminal end is a second secondary end of the IM device.

2. The IM device according to claim 1, wherein rectifiers are electrically connected in series with the secondary windings, and a flow of current is restricted based on a winding arrangement of the secondary windings and the rectifiers.

3. The IM device according to claim 2, wherein
the secondary windings include a first secondary winding and a second secondary winding, the first secondary winding is wound around any two of the first magnetic column, the second magnetic column, the third magnetic column and the fourth magnetic column, and the second secondary winding is wound around remaining two of the first magnetic column, the second magnetic column, the third magnetic column and the fourth magnetic column;
the first secondary winding and the second secondary winding are electrically connected in parallel;
for the two magnetic columns wound by the first secondary winding, a first portion of the first secondary winding wound around one of the two magnetic columns is electrically connected in parallel with a second portion of the first secondary winding wound around the other of the two magnetic columns, and the first portion and the second portion of the first secondary winding are respectively electrically connected in series with corresponding rectifiers;
for the two magnetic columns wound by the second secondary winding, a first portion of the second secondary winding wound around one of the two magnetic columns is electrically connected in parallel with a second portion of the second secondary winding wound around the other of the two magnetic columns, and the first portion and the second portion of the second secondary winding are respectively electrically connected in series with corresponding rectifiers; and
under a condition that the rectifier corresponding to the first magnetic column is set as a first rectifier, the rectifier corresponding to the second magnetic column is set as a second rectifier, the rectifier corresponding to the third magnetic column is set as a third rectifier, and the rectifier corresponding to the fourth magnetic column is set as a fourth rectifier, according to a winding arrangement of the first and second portions of the first secondary winding, a winding arrangement of the first and second portions of the second secondary winding, and the first, the second, the third and the fourth rectifiers, one of the first rectifier and the second rectifier is in an on-state due to the induced electromotive force, and the other one of the first rectifier and the second rectifier is in an off-state, and one of the third rectifier and the fourth rectifier is in an on-state due to the induced electromotive force, and the other one of the third rectifier and the fourth rectifier is in an off-state.

4. The IM device according to claim 2, wherein the secondary windings include a first secondary winding and a second secondary winding, the first secondary winding is wound around the first magnetic column and the fourth magnetic column, and the second secondary winding is wound around the second magnetic column and the third magnetic column; or, the first secondary winding is wound around the first magnetic column and the third magnetic column, and the second secondary winding is wound around the second magnetic column and the fourth magnetic column;

the first secondary winding and the second secondary winding are electrically connected in parallel;

the first secondary winding is electrically connected in series with a fifth rectifier;

the second secondary winding is electrically connected in series with a sixth rectifier; and according to a winding arrangement of the first and second secondary windings, the fifth rectifier and the sixth rectifier, one of the fifth rectifier and the sixth rectifier is in an on-state due to the induced electromotive force, and the other one of the fifth rectifier and the sixth rectifier is in an off-state.

5. The IM device according to claim 1, wherein the first magnetic column, the second magnetic column, the third magnetic column, and the fourth magnetic column are provided at or substantially at four vertices of a rectangle.

6. The IM device according to claim 1, wherein the first magnetic column, the second magnetic column, the third magnetic column, and the fourth magnetic column each include an air gap.

7. The IM device according to claim 1, wherein a terminal end of the first primary winding and a start end of the second primary winding are electrically connected in series.

8. The IM device according to claim 1, wherein a start end of the first primary winding and a start end of the second primary winding are electrically connected in parallel, and a terminal end of the first primary winding is electrically connected in parallel with a terminal end of the second primary winding.

9. An integrated magnetic (IM) device, comprising:
a magnetic core;
a primary winding; and
secondary windings, wherein
the magnetic core includes a base plate, a cover plate, and magnetic columns between the base plate and the cover plate;
the primary winding and the secondary windings are respectively wound around the magnetic columns to define a closed magnetic flux loop;
the magnetic columns include a first magnetic column, a second magnetic column, a third magnetic column, and a fourth magnetic column;
the primary winding is wound around the first magnetic column and the second magnetic column, and winding directions of the primary winding on the first magnetic column and the second magnetic column are the same;
when a voltage is applied to the primary winding, a current flows through one of a portion of the secondary windings wound around the first magnetic column and a portion of the secondary windings wound around the second magnetic column due to an induced electromotive force, and a current flows through one of a portion of the secondary windings wound around the third magnetic column and a portion of the secondary windings wound around the fourth magnetic column due to the induced electromotive force, wherein the induced electromotive force is generated by a current flowing through the primary winding;

the primary winding has a primary winding start end and a primary winding terminal end, the primary winding start end is a first primary end of the IM device, and the primary winding terminal end is a second primary end of the IM device; and the secondary windings include a secondary winding start end and a secondary winding terminal end, the secondary winding start end is a first secondary end of the IM device, and the secondary winding terminal end is a second secondary end of the IM device.

10. The IM device according to claim 9, wherein rectifiers are electrically connected in series with the secondary windings, and a flow of current is restricted based on a winding arrangement of the secondary windings and the rectifiers.

11. The IM device according to claim 10, wherein:
the secondary windings include a first secondary winding and a second secondary winding, the first secondary winding is wound around any two of the first magnetic column, the second magnetic column, the third magnetic column and the fourth magnetic column, and the second secondary winding is wound around remaining two of the first magnetic column, the second magnetic column, the third magnetic column and the fourth magnetic column;

the first secondary winding and the second secondary winding are electrically connected in parallel;

for the two magnetic columns wound by the first secondary winding, a first portion of the first secondary winding wound around one of the two magnetic columns is electrically connected in parallel with a second portion of the first secondary winding wound around the other one of the two magnetic columns, and the first portion and the second portion of the first secondary winding are respectively electrically connected in series with corresponding rectifiers;

for the two magnetic columns wound by the second secondary winding, a first portion of the second secondary winding wound around one of the two magnetic columns is electrically connected in parallel with a second portion of the second secondary winding wound around the other one of the two magnetic columns, and the first portion and the second portion of the second secondary winding are respectively electrically connected in series with corresponding rectifiers; and under a condition that the rectifier corresponding to the first magnetic column is set as a first rectifier, the rectifier corresponding to the second magnetic column is set as a second rectifier, the rectifier corresponding to the third magnetic column is set as a third rectifier, and the rectifier corresponding to the fourth magnetic column is set as a fourth rectifier, according to a winding arrangement of the first and second portions of the first secondary winding, a winding arrangement of the first and second portions of the second secondary winding, and the first, the second, the third and the fourth rectifiers, one of the first rectifier and the second rectifier is in an on-state due to the induced electromotive force, and the other one of the first rectifier and the second rectifier is in an off-state, and one of the third rectifier and the fourth rectifier is in an on-state due to the induced electromotive force, and the other one of the third rectifier and the fourth rectifier is in an off-state.

12. The IM device according to claim 10, wherein:
the secondary windings include a first secondary winding and a second secondary winding, the first secondary winding is wound around the first magnetic column and the fourth magnetic column, and the second secondary winding is wound around the second magnetic column and the third magnetic column; or, the first secondary winding is wound around the first magnetic column and the third magnetic column, and the second secondary winding is wound around the second magnetic column and the fourth magnetic column;
the first secondary winding and the second secondary winding are electrically connected in parallel;
the first secondary winding is electrically connected in series with a fifth rectifier;
the second secondary winding is electrically connected in series with a sixth rectifier; and
according to a winding arrangement of the first and second secondary windings, the fifth rectifier and the sixth rectifier, one of the fifth rectifier and the sixth rectifier is in an on-state due to the induced electromotive force, and the other one of the fifth rectifier and the sixth rectifier is in an off-state.

13. The IM device according to claim 9, wherein the first magnetic column, the second magnetic column, the third magnetic column, and the fourth magnetic column are provided at or substantially at four vertices of a rectangle.

14. The IM device according to claim 9, wherein the first magnetic column, the second magnetic column, the third magnetic column, and the fourth magnetic column each include an air gap.

15. A Direct Current-Direct Current (DC-DC) converter, comprising:
the integrated magnetic (IM) device according to claim 1;
a primary circuit coupled to the first primary end and the second primary end of the IM device; and
a secondary circuit coupled to the first secondary end and the second secondary end of the IM device.

16. The DC-DC converter according to claim 15, wherein the primary circuit is selected from a group consisting of a half bridge converter, a full bridge converter, and an LLC converter.

17. The DC-DC converter according to claim 15, wherein the secondary circuit is a current doubler rectifier circuit.

18. The IM device according to claim 6, wherein the air gap is provided between the magnetic columns and the base plate or the cover plate.

19. The IM device according to claim 4, wherein the fifth rectifier is electrically connected in series with a lead-out end of a coil of the first secondary winding wound around the third magnetic column, and the sixth rectifier is electrically connected in series with a lead-out end of a coil of the second secondary winding.

* * * * *